(12) United States Patent
Hauser et al.

(10) Patent No.: US 9,126,579 B1
(45) Date of Patent: Sep. 8, 2015

(54) VEHICLE DRIVE AND CONTROL SYSTEM

(71) Applicant: Hydro-Gear Limited Partnership, Sullivan, IL (US)

(72) Inventors: Raymond Hauser, Sullivan, IL (US); Christopher K. Wyatt, Oneco, FL (US); Lonnie E. Holder, Columbus, IN (US); Scott W. Keller, Charleston, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 0 days.

(21) Appl. No.: 14/083,130

(22) Filed: Nov. 18, 2013

Related U.S. Application Data

(63) Continuation of application No. 13/553,439, filed on Jul. 19, 2012, now Pat. No. 8,585,534, which is a continuation of application No. 13/193,076, filed on Jul. 28, 2011, now Pat. No. 8,226,519, which is a continuation of application No. 11/681,461, filed on Mar. 2, 2007, now Pat. No. 7,988,582, which is a continuation-in-part of application No. 10/965,259, filed on Oct. 14, 2004, now Pat. No. 7,186,200.

(51) Int. Cl.
| | |
|---|---|
| *F16H 47/08* | (2006.01) |
| *B60W 10/11* | (2012.01) |
| *B60W 10/196* | (2012.01) |
| *F16H 47/04* | (2006.01) |
| *B60K 17/16* | (2006.01) |

(52) U.S. Cl.
CPC .............. *B60W 10/11* (2013.01); *B60K 17/16* (2013.01); *B60W 10/196* (2013.01); *F16H 47/04* (2013.01)

(58) Field of Classification Search
CPC .......... F16H 47/04; F16H 47/08; F16H 48/10; B60K 17/16
See application file for complete search history.

(56) References Cited

U.S. PATENT DOCUMENTS

| | | | |
|---|---|---|---|
| 1,734,718 | A | 11/1929 | Donald |
| 2,684,740 | A | 7/1954 | Mader |
| 2,946,239 | A | 7/1960 | Hait |
| 2,950,633 | A | 8/1960 | Goodrich |
| 3,119,281 | A | 1/1964 | Gerber et al. |
| 3,303,723 | A | 2/1967 | Ruf |
| 3,581,600 | A | 6/1971 | Holdeman |
| 3,698,498 | A | 10/1972 | Stanford |
| 3,949,848 | A | 4/1976 | Fogelber |
| 3,964,562 | A | 6/1976 | Kawamura et al. |
| 3,966,005 | A | 6/1976 | Binger |
| 3,969,958 | A | 7/1976 | Miyao et al. |

(Continued)

*Primary Examiner* — Derek D Knight
(74) *Attorney, Agent, or Firm* — Neal, Gerber & Eisenberg LLP

(57) ABSTRACT

A control system for use in a vehicle having left and right clutch assemblies, each clutch assembly including a brake mechanism and a drive mechanism. The control system includes a steering switch having a left steering position to actuate the left brake mechanism and the right drive mechanism, a neutral steering position to actuate the left and right drive mechanisms, and a right steering position to actuate the left drive mechanism and the right brake mechanism. The system may also include an operator switch having a first position to actuate brake mechanisms and disable the steering switch, and a second position that passes control of both brake clutch assemblies to the steering switch. The system may further include a brake switch having a brake position that actuates both brake mechanisms and disables the operator switch and the steering switch, and a drive position that passes control of both clutch assemblies to the operator switch.

16 Claims, 27 Drawing Sheets

(56) References Cited

U.S. PATENT DOCUMENTS

| | | | |
|---|---|---|---|
| 4,667,784 A | 5/1987 | Cronin | |
| 4,757,885 A * | 7/1988 | Kronich | 477/200 |
| 4,879,867 A | 11/1989 | Wenzel | |
| 4,895,210 A | 1/1990 | Witzel | |
| 4,920,734 A | 5/1990 | Wenzel | |
| 4,949,823 A | 8/1990 | Coutant et al. | |
| 5,012,907 A | 5/1991 | Fujioka et al. | |
| 5,083,993 A | 1/1992 | Oun | |
| 5,135,071 A | 8/1992 | Shibahata et al. | |
| 5,201,692 A | 4/1993 | Johnson et al. | |
| 5,427,217 A | 6/1995 | Patridge | |
| 5,536,219 A | 7/1996 | Umemoto et al. | |
| 5,782,717 A | 7/1998 | Smothers et al. | |
| 5,997,425 A | 12/1999 | Coutant et al. | |
| 6,354,978 B1 | 3/2002 | Brackin et al. | |
| 6,419,035 B1 | 7/2002 | Plamper | |
| 6,571,894 B2 | 6/2003 | Ishimaru et al. | |
| 6,702,701 B2 | 3/2004 | Phelan et al. | |
| 6,755,264 B2 | 6/2004 | Hasegawa et al. | |
| 6,942,082 B1 | 9/2005 | Bunnow et al. | |
| 6,962,227 B1 | 11/2005 | Kirkwood | |
| 7,186,200 B1 | 3/2007 | Hauser | |
| 7,258,187 B2 | 8/2007 | Bowen | |
| 7,350,630 B1 | 4/2008 | Hauser et al. | |
| 7,476,019 B2 | 1/2009 | Kubo | |
| 7,479,088 B2 | 1/2009 | Baasch et al. | |
| 7,951,036 B2 | 5/2011 | Sackl et al. | |
| 7,988,582 B1 | 8/2011 | Hauser | |
| 2002/0032098 A1 * | 3/2002 | Ohtsuka | 477/94 |

* cited by examiner

VEHICLE DRIVE AND CONTROL SYSTEM

CROSS-REFERENCE

This application is a continuation of U.S. patent application Ser. No. 13/553,439 filed on Jul. 19, 2012, which is a continuation of U.S. patent application Ser. No. 13/193,076 filed on Jul. 28, 2011, now U.S. Pat. No. 8,226,519, which is a continuation of U.S. patent application Ser. No. 11/681,461 filed on Mar. 2, 2007, now U.S. Pat. No. 7,988,582, which is a continuation-in-part of U.S. patent application Ser. No. 10/965,259, filed on Oct. 14, 2004, now U.S. Pat. No. 7,186,200. The contents of these applications are incorporated herein by reference.

BACKGROUND OF THE INVENTION

This invention relates to the use of a planet gear system to brake and drive a vehicle.

SUMMARY OF THE INVENTION

A planet brake differential is described herein. The details of the invention are set forth below in connection with the detailed description of the embodiments.

DETAILED DESCRIPTION OF DRAWINGS

Figure 1:
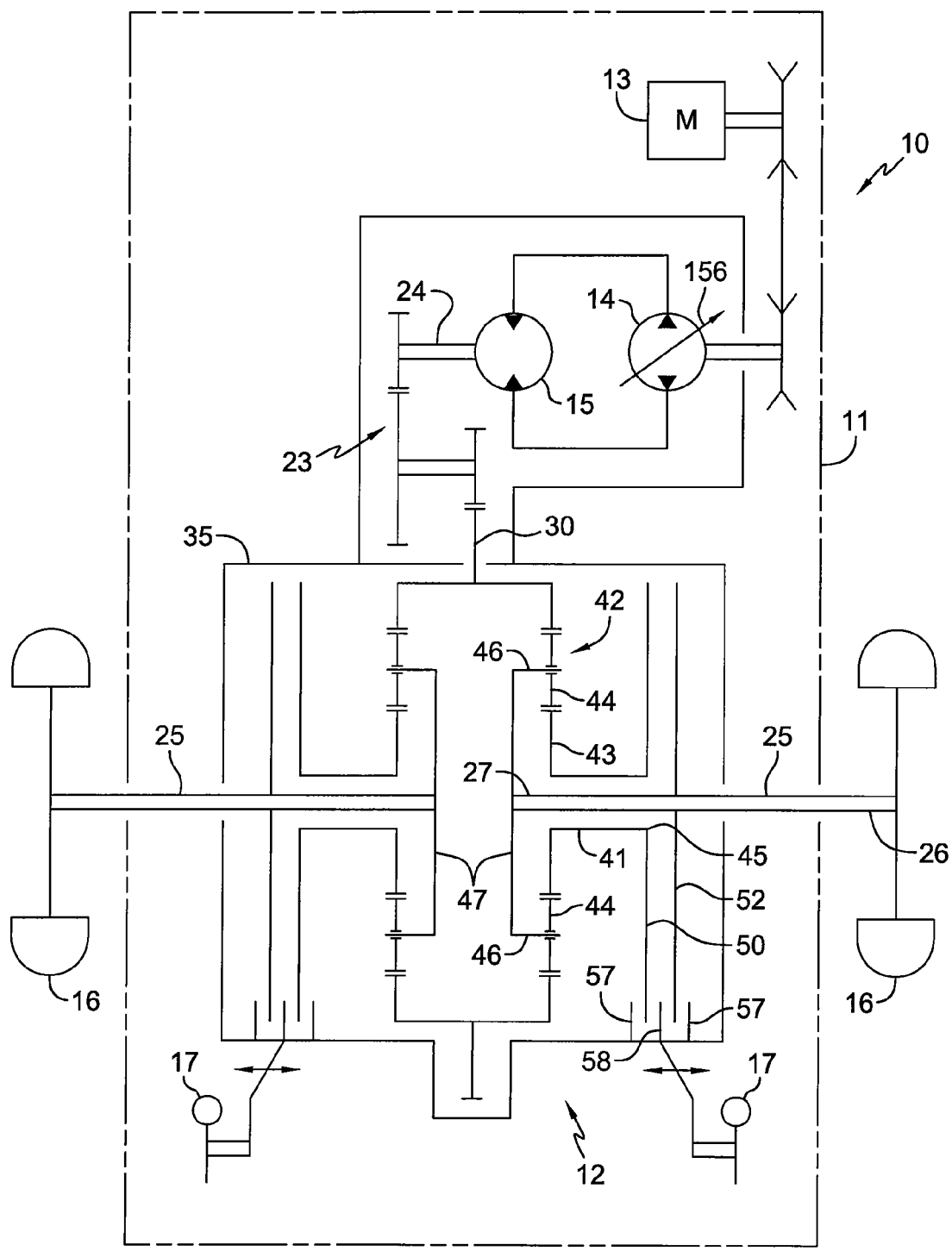
FIG. 1 depicts a schematic of an exemplary vehicle comprising an embodiment of the present invention.

FIG. 1 depicts a schematic of an exemplary vehicle 10 comprising an embodiment of the present invention. Vehicle 10 has a frame 11 on which planet brake differential 12 is mounted. As the configuration of vehicle 10 is well known in the art, it will only generally be described herein. Prime mover 13 is mounted on frame 11 and drives hydraulic pump 14 which is hydraulically connected to and drives hydraulic motor 15. Motor 15 is in turn drivingly engaged to planet brake differential 12. Planet brake differential 12 is drivingly engaged to wheels 16 through a pair of axles 25. Control handles 17 are also mounted to frame 11. It will be understood by one in the art that FIG. 1 depicts a schematic of an exemplary embodiment rather than a limiting one. Planet brake differential 12 has many applications and is not limited to applications such as vehicle 10, nor is it limited to use with vehicles, as there are industrial applications for such units. Neither is planet brake differential 12 limited to applications in hydraulic or hydrostatic devices as other drive systems may be used, such as one using a clutch to select a gear or a variable speed transmission ("VST").

Figure 2:
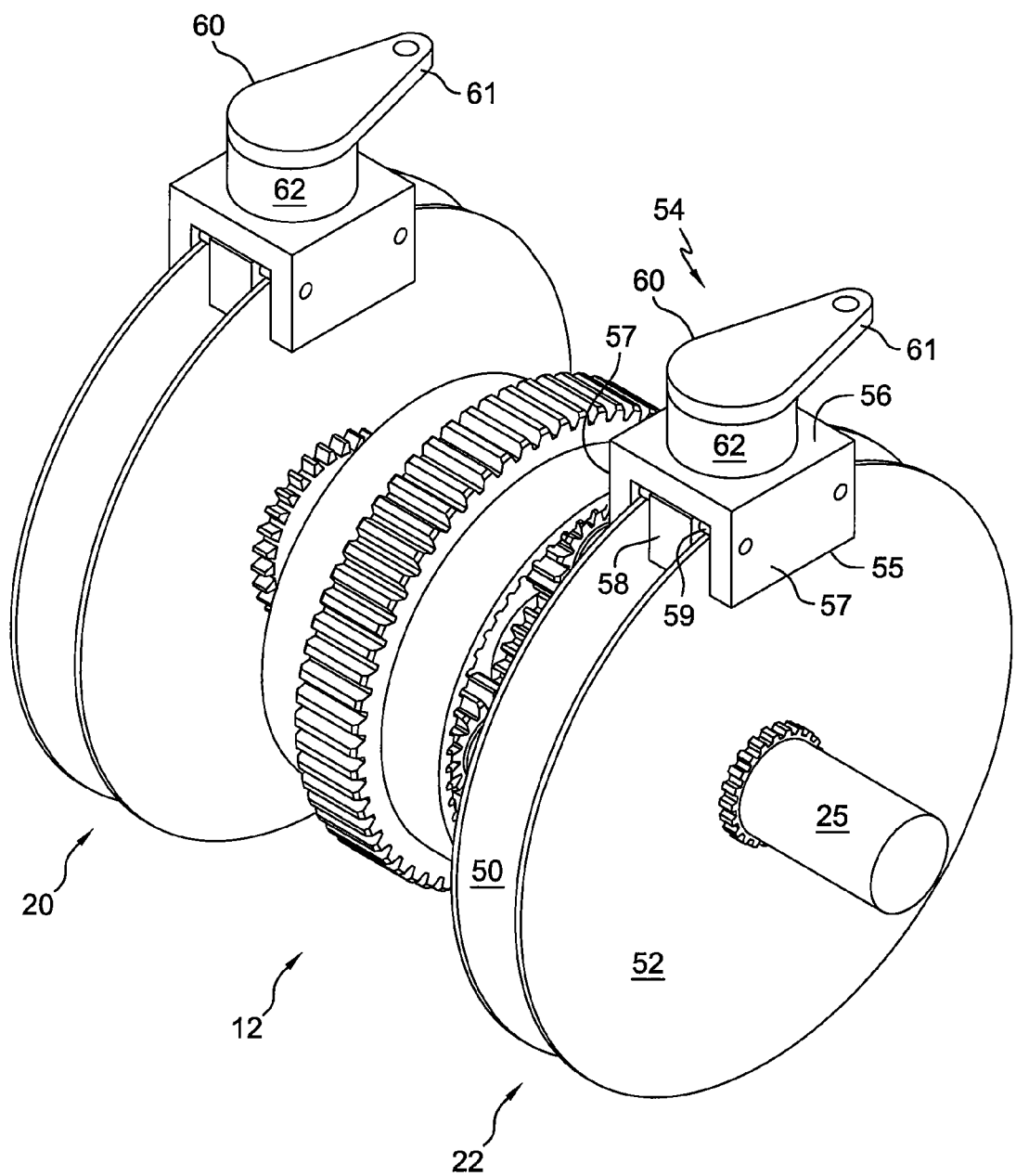
FIG. 2 depicts a perspective view of an embodiment of the present invention.
Figure 3:
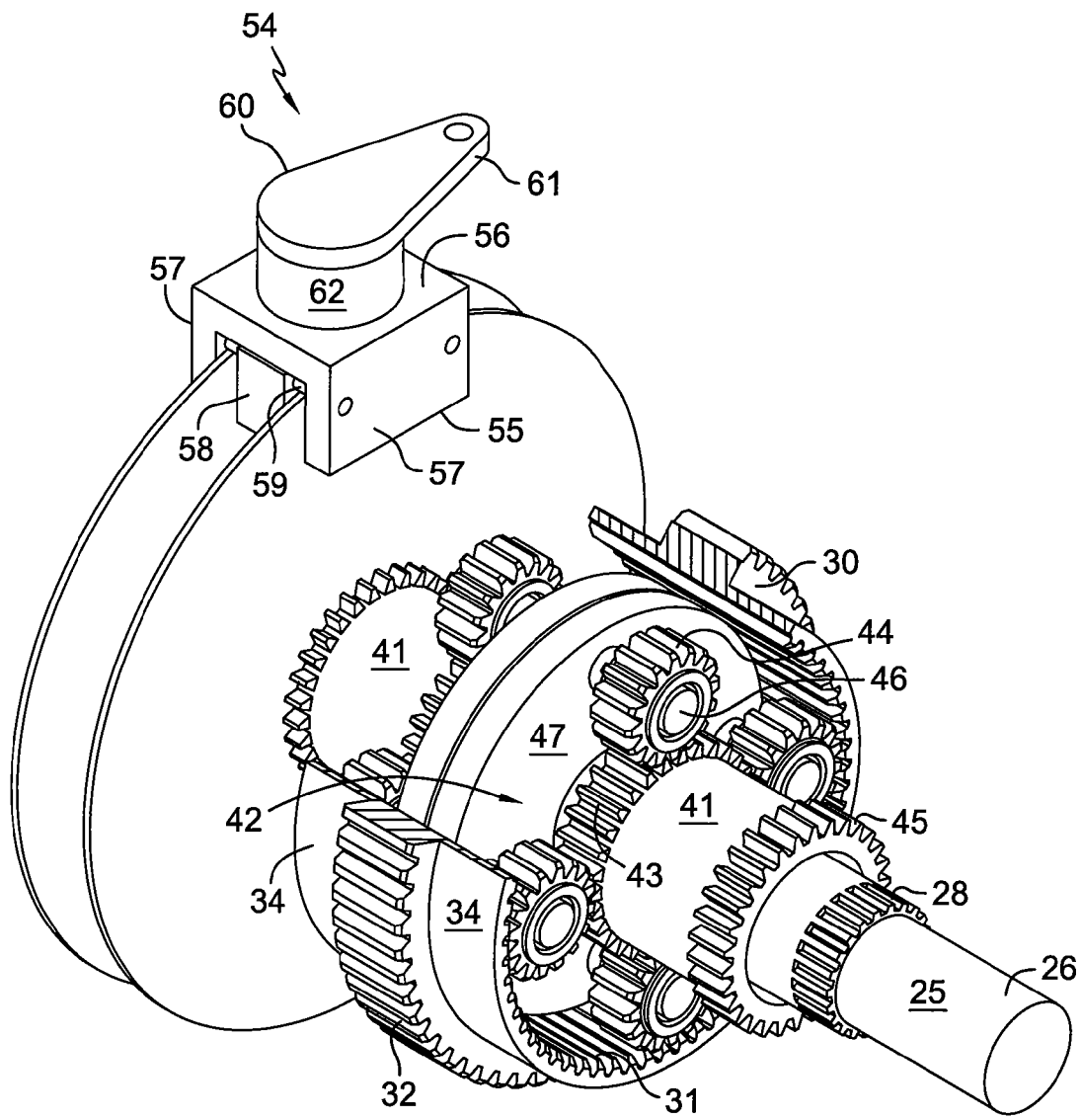
FIG. 3 depicts the perspective view as seen in FIG. 2 with several elements omitted for clarity.

FIG. 2 depicts a perspective view of an exemplary embodiment of the present invention. As shown in FIG. 2, and in more detail in FIGS. 3-6, the depicted embodiment of the present invention involves two brake-clutch assemblies 20 and 22. For convenience, only the elements of assembly 22 are described herein in detail. It will be appreciated by those in the art that the same descriptions will apply to the corresponding elements in assembly 20. It will likewise be understood that the embodiment depicted in FIG. 2 is merely exemplary and is not meant to be limiting. By way of example, axle 25, as set forth in detail below, may be engaged at each end to a separate output device, such as wheels 16, in which case assembly 20 would not be needed.

Ring gear 30 is located within and rotatable with respect to differential housing 35. As shown more clearly in FIG. 3, ring gear 30 has an input gear form 32 and support structures 34 extending from either side of input gear form 32. Ring gear 30 is supported by housing 35 at support structures 34. It will be appreciated that this is an exemplary embodiment, and ring gear 30 may be supported by other known means.

Axle 25, which has a first end 26, a second end 27 and a splined segment 28 therebetween, is located within and rotatable with respect to housing 35. Axle 25 extends through housing 35, and is drivingly engaged at first end 26 to an output device, such as wheels 16 or any other known output device. Axle 25 may be retained in housing 35 by a variety of techniques. For example, one or more washers may be positioned between the shoulder of spline 28 and an interior portion of housing 35. Alternatively, a snap ring may be used to locate and retain axle 25 within housing 35. As there are a number of retention methods, and those methods are unrelated to the present invention, they are not detailed herein.

Brake-clutch assembly 22 is disposed about axle 25 within housing 35. Brake-clutch assembly 22 comprises drive plate 50, brake plate 52, engagement assembly 54, which is located proximate to drive plate 50 and brake plate 52, and planetary gear arrangement 42, which is disposed about second end 27 of axle 25.

Planetary gear arrangements are generally well known in the art, and will only briefly be described herein. For a more detailed description of a known planetary gear design, see commonly assigned U.S. Pat. No. 5,782,717, which is incorporated herein by reference. As shown most clearly in FIGS. 1 and 3, planetary gear arrangement 42 comprises sun gear 43 and a plurality of planet gears 44 symmetrically disposed about sun gear 43. Planet gears 44 are mated to and driven by interior gear form 31 of ring gear 30. Four planet gears 44 are shown in the embodiment depicted in FIG. 3, but any number of planet gears may be utilized so long as the number and arrangement of such gears is sufficient to meet the loading requirements of brake-clutch assembly 22. Gear arrangement 42 also comprises a spur gear 45, which is engaged to sun gear 43. In the embodiment depicted, spur gear 45 and sun gear 43 are formed as a unitary component, as both gears are formed on opposite ends of sleeve 41. Other constructions may be used within the spirit of this invention.

Each planet gear 44 is rotatably mounted on a corresponding pin 46 extending from planet gear carrier 47. Planet gear carrier 47 is splined to and supported by axle 25, such that planet gear carrier 47 and axle 25 rotate at the same rate.

Drive plate 50 is mounted on and driven by spur gear 45 and drive plate 50 is axially slidable with respect to spur gear 45.

Brake plate 52 is mounted on and driven by splined portion 28 of axle 25 so that brake plate 52 is axially slidable with respect to splined portion 28.

Engagement assembly 54 is disposed about drive plate 50 and brake plate 52. In the depicted embodiment, engagement assembly 54 comprises engagement block 55, slider block 58 and control arm 60. Engagement block 55 is mounted to housing 35 through fasteners (not shown) and has a top side 56 and two side walls 57 extending therefrom, and at least one rail 59 positioned between the two side walls 57. Engagement block 55 is positioned such that portions of drive plate 50 and brake plate 52 are disposed between respective interior portions of side walls 57 and a portion of slider block 58. Slider block 58 is disposed on rail 59 and is slidable between any one of three positions; neutral, drive and brake. Each of the three positions will be described in more detail below.

Control arm 60 comprises handle member 61 integrally formed with shaft 62, and shaft 62 extends through top side 56 of engagement block 55 to engage slider block 58. Handle member 61 of control arm 60 may be coupled with control handle 17 through a known means, such as a cable. Therefore, the position of slider block 58 may be actuated by manipulating the corresponding control handle 17. The engagement of shaft 62 with slider block 58 is by way of a cam (not shown) formed on the end of shaft 62 that engages slider block 58. As cams and cable connections are known in the art, the details of these items are not shown.

Ring gear 30 is driven by gear train 23, which is powered by motor output shaft 24. As hydraulic motors are generally well known in the art, the details of motor 15 are not disclosed herein. For an example of a hydraulic motor, see commonly owned U.S. Pat. No. 5,201,692, which is incorporated herein by reference. As ring gear 30 rotates, it will drive each of planet gears 44. When slider block 58 is in the neutral position, the resistance of the axle shaft to movement by contact with the ground causes rotation of gear 30 to be freely communicated through planets 44 into sun gear 43, which freely rotates with respect to axle shaft 25 and housing 35.

Figure 5:
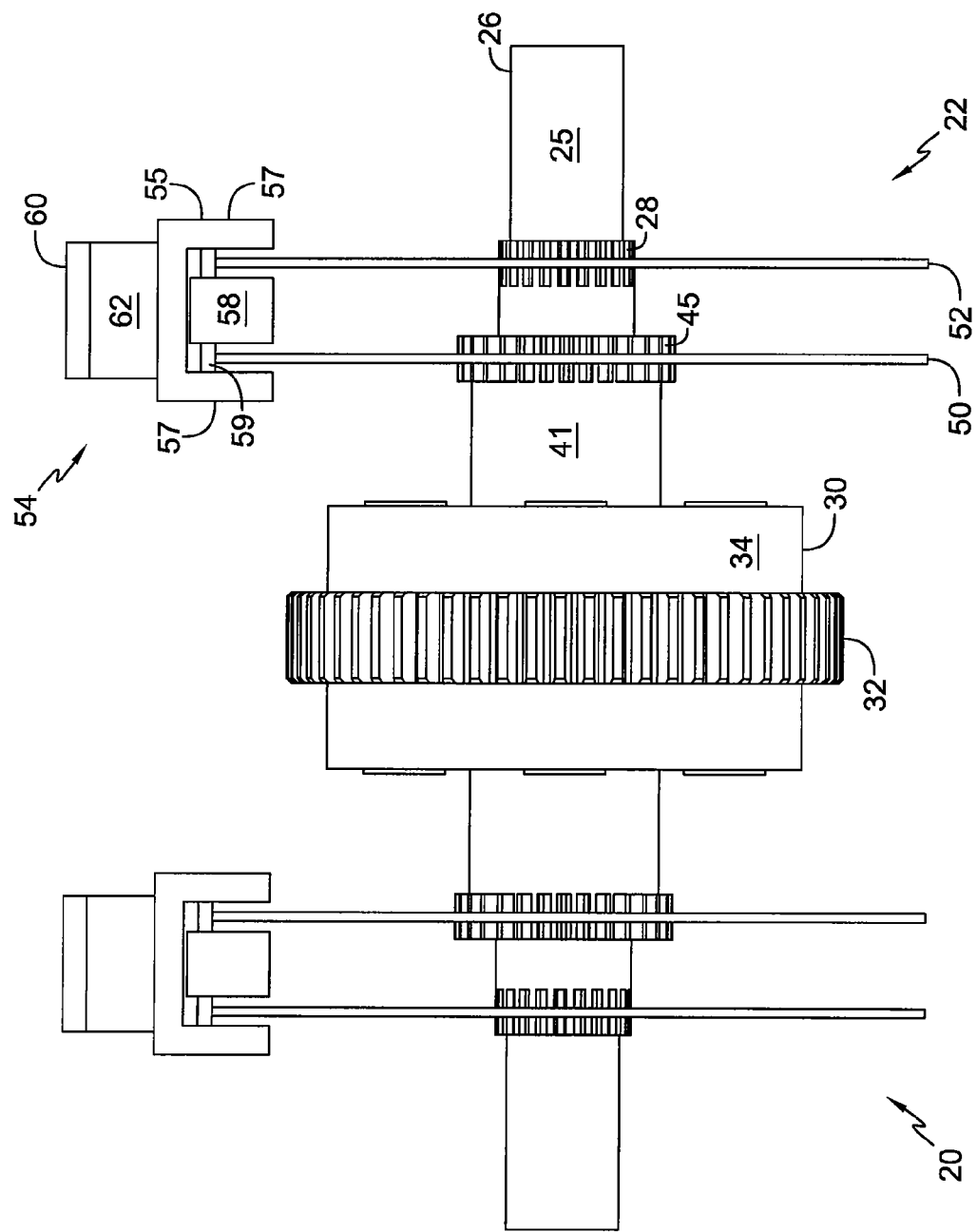
FIG. 5 depicts a front-end view of an embodiment of the present invention in the neutral position, as more fully described below.
Figure 6:
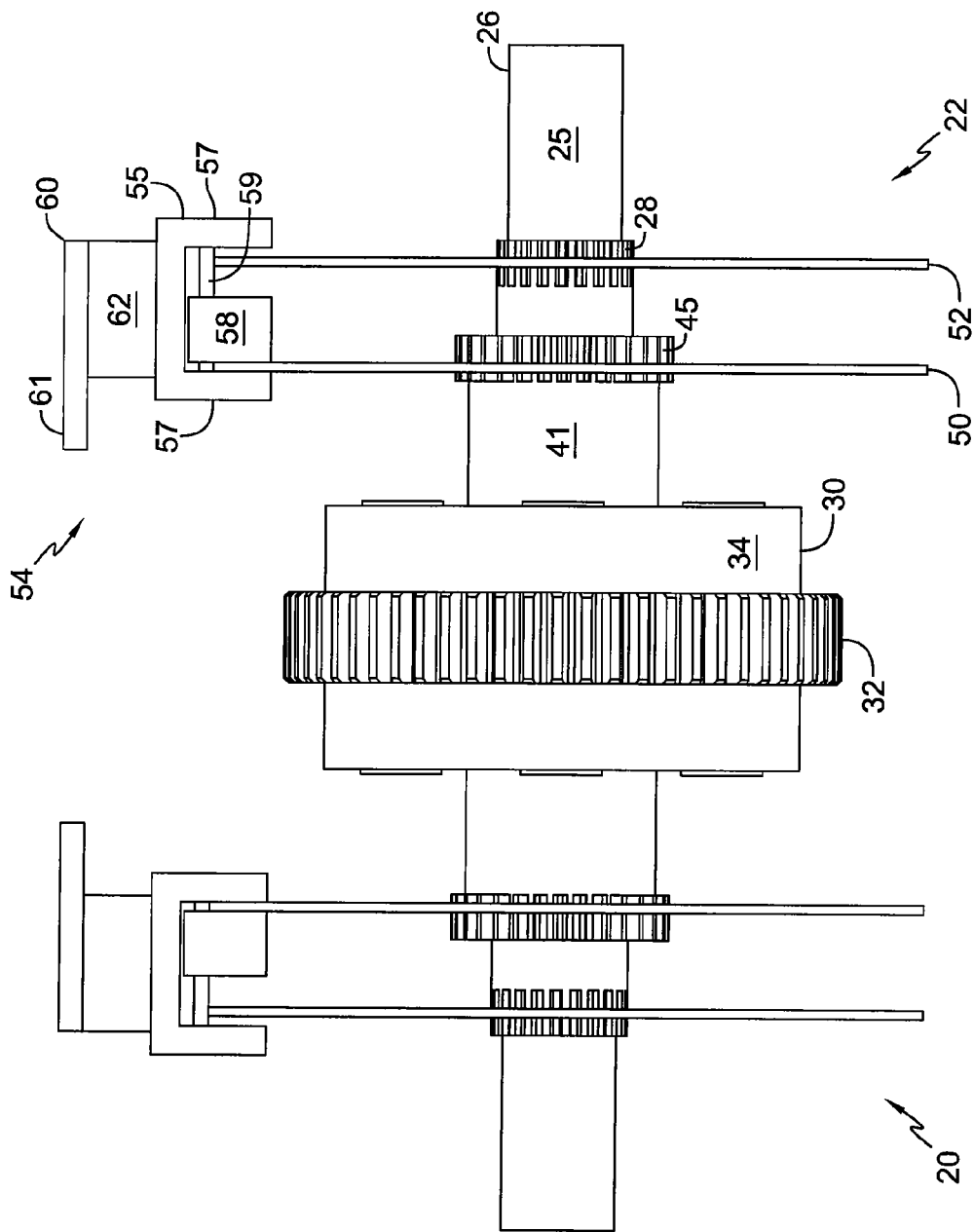
FIG. 6 depicts a front-end view of an embodiment of the present invention in the drive position, as more fully described below.

When slider block 58 is not engaged with either drive plate 50 or brake plate 52, it is in the neutral position, as depicted in FIG. 5. In this position, both drive plate 50 and brake plate 52 are free to rotate with respect to housing 35. Moving slider block 58 from the neutral position toward drive plate 50 moves slider block 58 into the drive position, as depicted in FIG. 6. In the drive position, frictional forces acting between engagement block 55 and slider block 58 will prevent rotation of drive plate 50. Because drive plate 50 is splined to spur gear 45, spur gear 45, which is connected to sun gear 43, will likewise be prevented from rotating with respect to housing 35. With slider block 58 in the drive position, ring gear 30 will drive each of planet gears 44. Because sun gear 43 is not free to rotate, planet gears 44 will now be forced to rotate about stationary sun gear 43. The rotation of planet gears 44 about stationary sun gear 43 will in turn cause planet gear carrier 47 to rotate, thereby driving axle 25.

Figure 4:
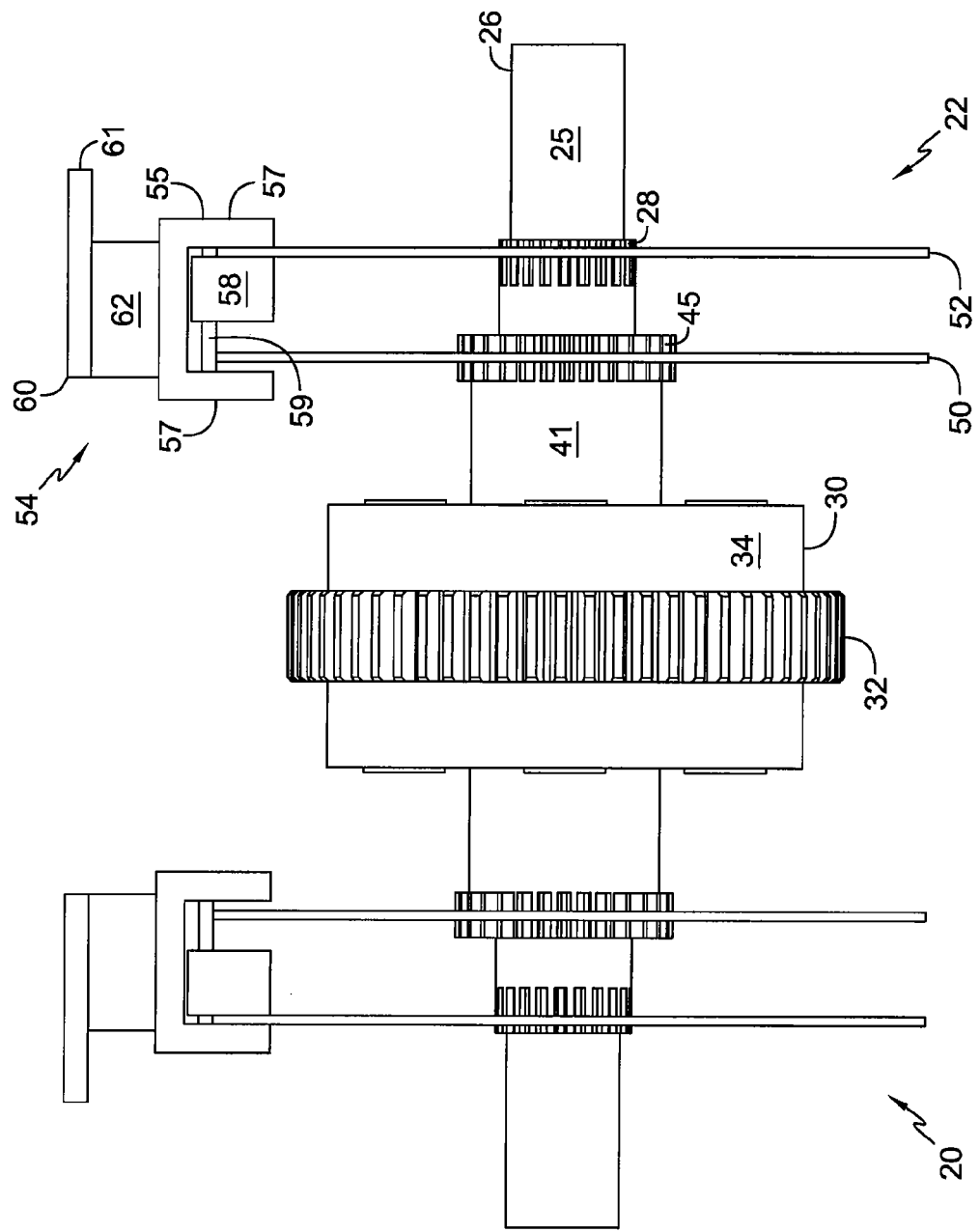
FIG. 4 depicts a front-end view of an embodiment of the present invention in the brake position, as more fully described below.

Moving slider block 58 from the drive position toward brake plate 52 moves slider block 58 into the brake position as depicted in FIG. 4. When slider block 58 is in the brake position, frictional forces acting between engagement block 55 and slider block 58 will prevent brake plate 52 from rotating with respect to housing 35. Because brake plate 52 and planet gear carrier 47 rotate at the same rate, due to both being splined to axle 25, planet gear carrier 47 will not be able to rotate with respect to housing 35. Because of this, with rotation of gear 30 planet gears 44 will rotate in place, driving sun gear 43 about stationary axle shaft 25.

Figure 7:
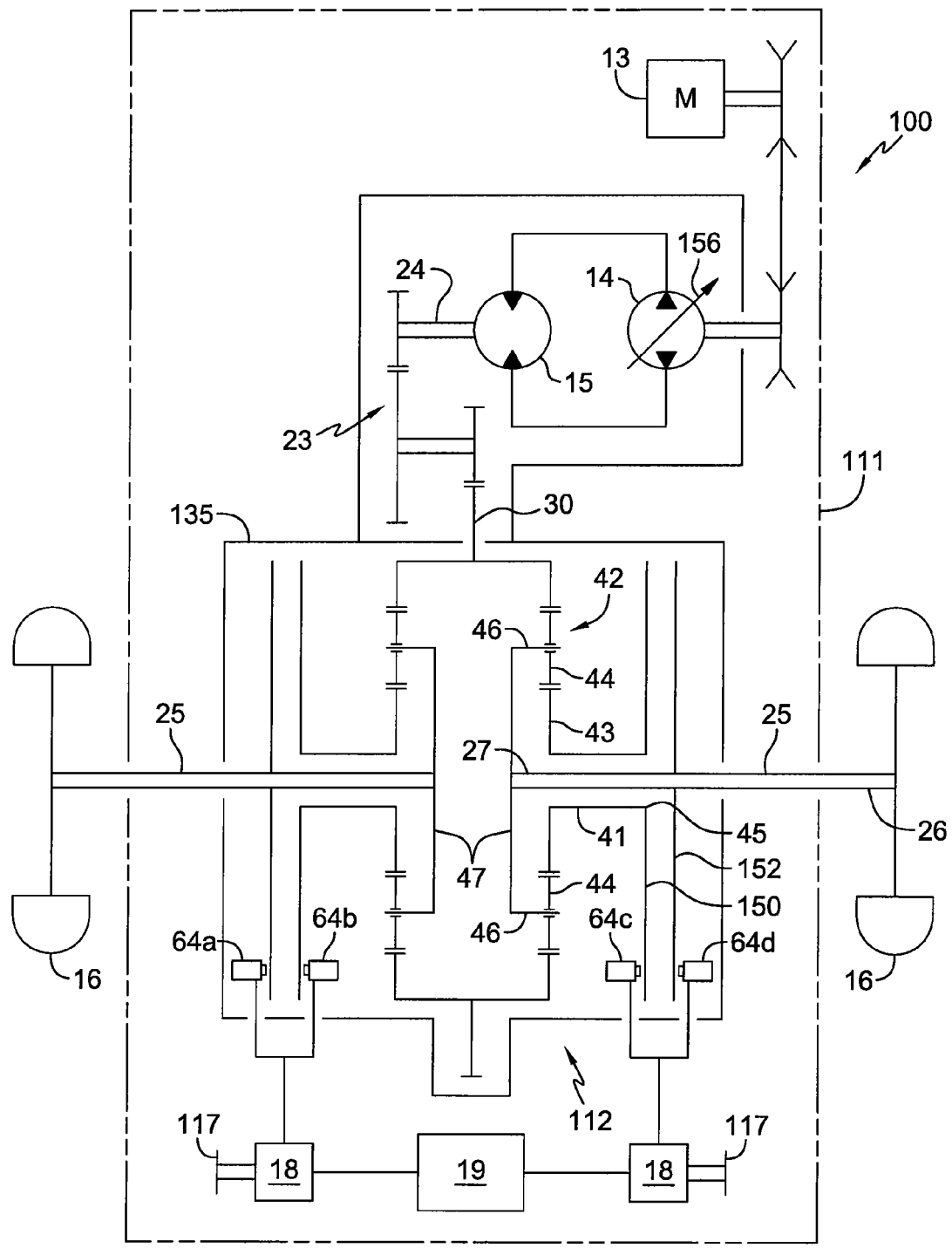
FIG. 7 depicts a schematic of an exemplary vehicle comprising a second embodiment of the present invention.
Figure 8:
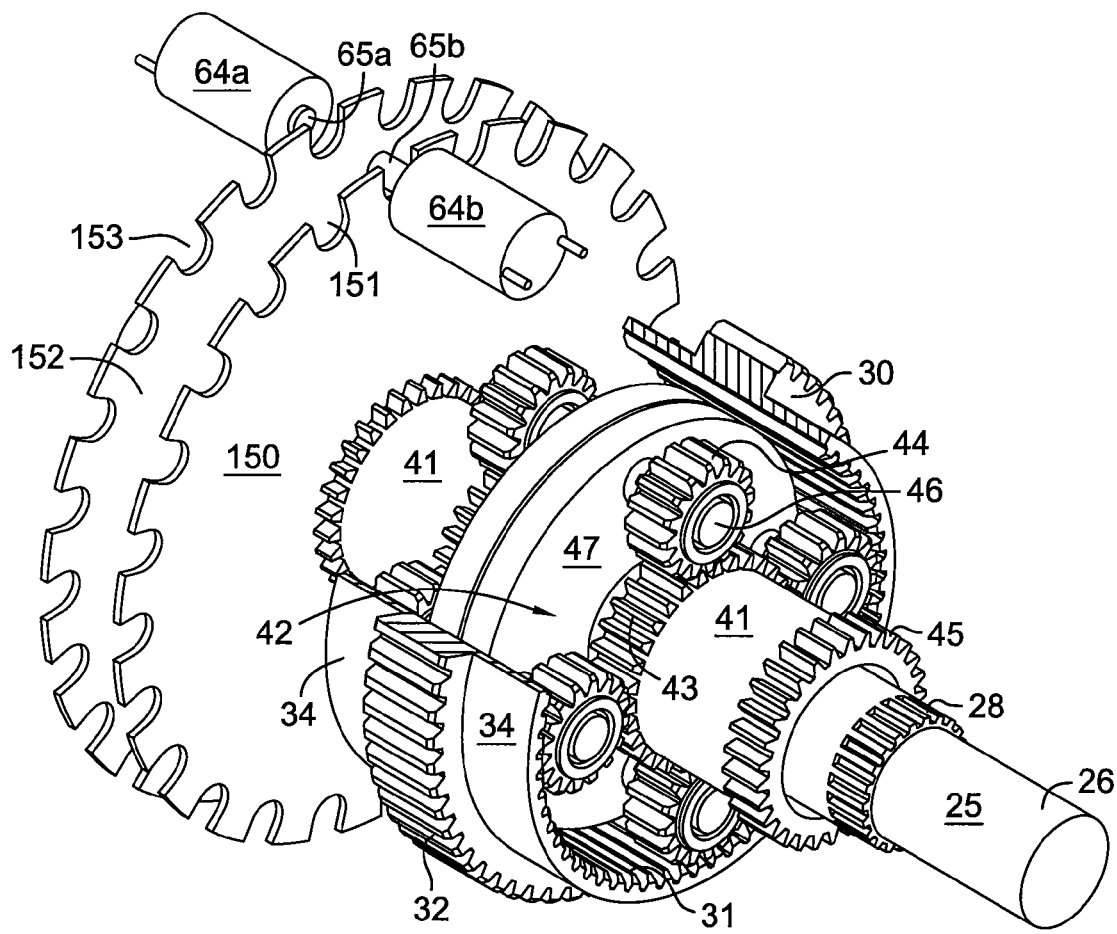
FIG. 8 depicts a perspective view of a second embodiment of the present invention.

FIGS. 7 to 11 depict a second embodiment of the present invention. FIG. 7 depicts a schematic of an exemplary vehicle 100 comprising a second embodiment of the present invention. Vehicle 100 has a frame 111 on which differential housing 135 containing planet brake differential 112 is mounted. The configuration of vehicle 100 differs from that of vehicle 10 in that planet brake differential 112 is remotely controlled. Operator controls 117 actuate mechanisms 18, which may be hydraulic valves or electronic switches. Mechanisms 18 will be provided with power by power source 19, which may be either a source of electrical power or a source of hydraulic power. Mechanisms 18 will then control actuators 64a, 64b, 64c and 64d, which may be electric actuators or hydraulic actuators, such as pistons. For the embodiment depicted in FIGS. 7 to 11, actuators 64a-d will be described as solenoids.

As depicted in FIGS. 8 to 11, solenoid 64b is positioned in proximity to drive plate 150 of brake clutch assembly 120, while solenoid 64a is positioned in proximity to brake plate 152, also of brake clutch assembly 120. As seen, openings 151 are formed on the periphery of drive plate 150. As described more fully below, when solenoid 64b is actuated, plunger 65b interacts with one of the openings 151. Similarly, openings 153 are formed on the periphery of brake plate 152, such that plunger 65a may engage with one of openings 153.

Figure 9:
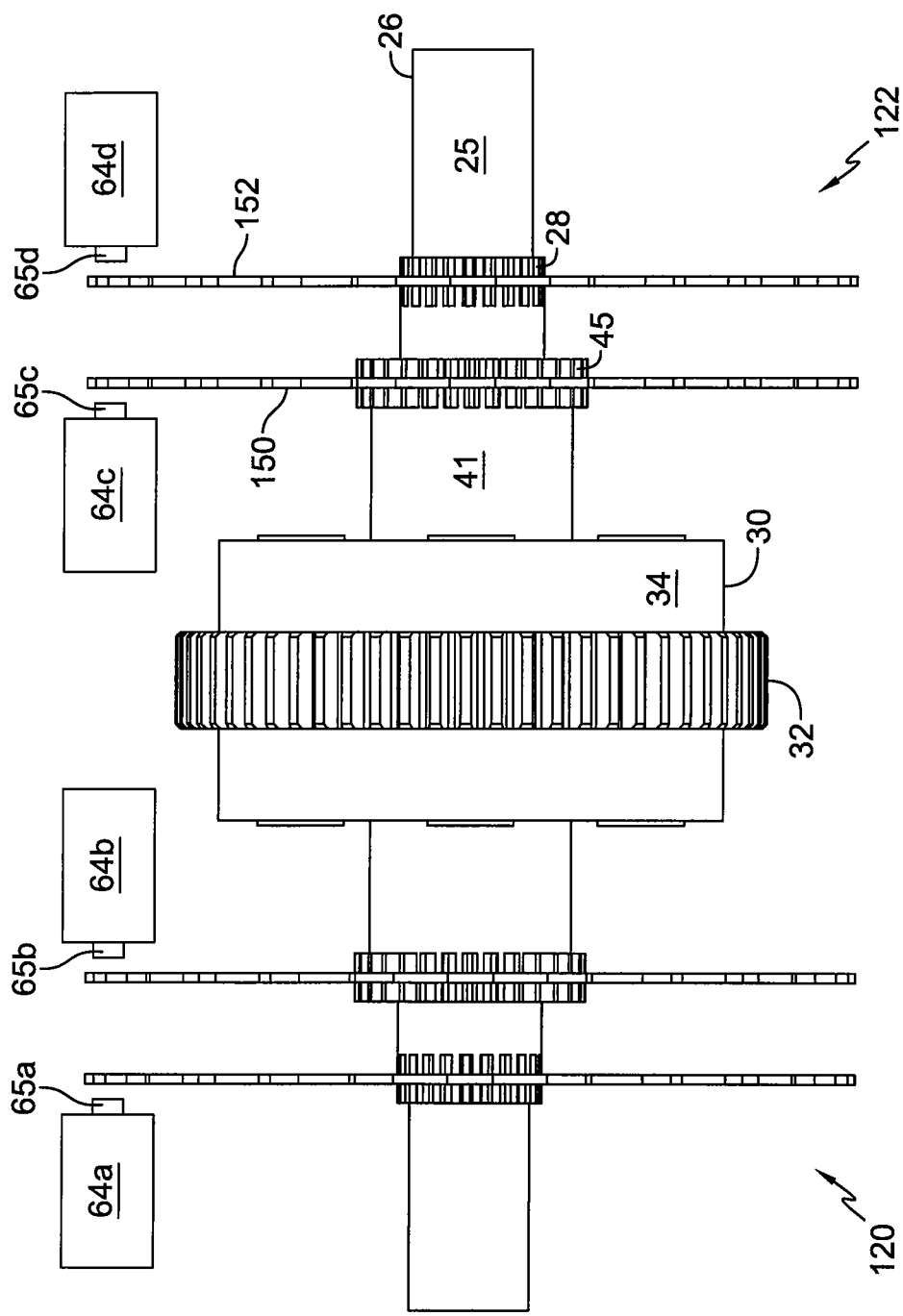
FIG. 9 depicts a front-end view of a second embodiment of the present invention in the neutral position, as more fully described below.

As depicted in FIG. 9, when plungers 65a-d are refracted into respective solenoids 64a-d, then planet brake differential 112 will be in a neutral condition. Such a condition will permit motion of vehicle 100 that is known in the art as "free wheeling."

Figure 10:
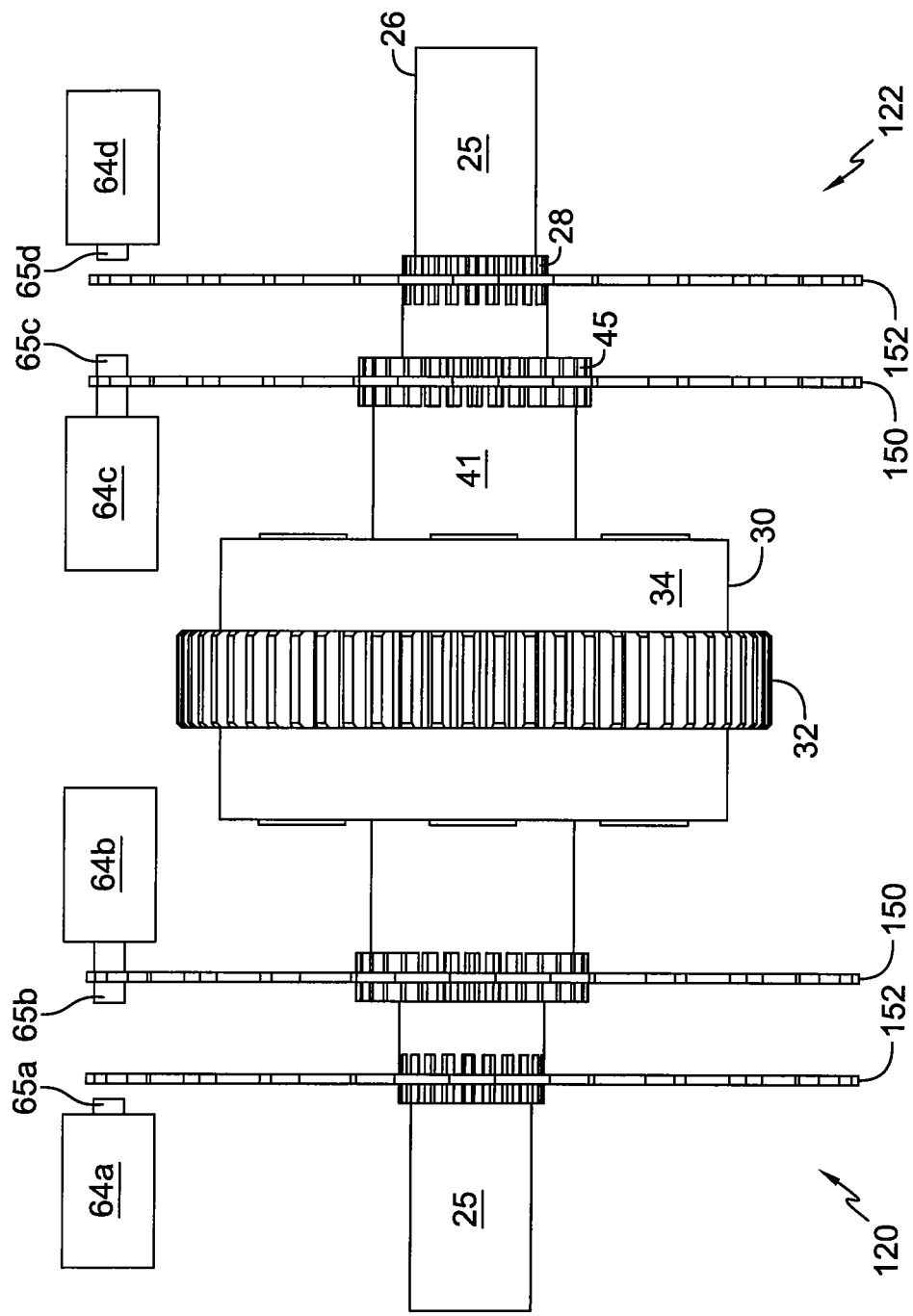
FIG. 10 depicts a front-end view of a second embodiment of the present invention in a drive position, as more fully described below.

As will be appreciated in the art, each solenoid 64a-d may be independently actuated. For example, if an operator actuates solenoids 64b and 64c, so that plungers 65b and 65c engage their respective drive plates 150, as shown in FIG. 10, then each drive plate 150 in brake clutch assembly 120 and brake clutch assembly 122 will be fixed. Rotation from gear train 23 will then be transmitted to axles 25, which will cause vehicle 100 to move forward.

Figure 11:
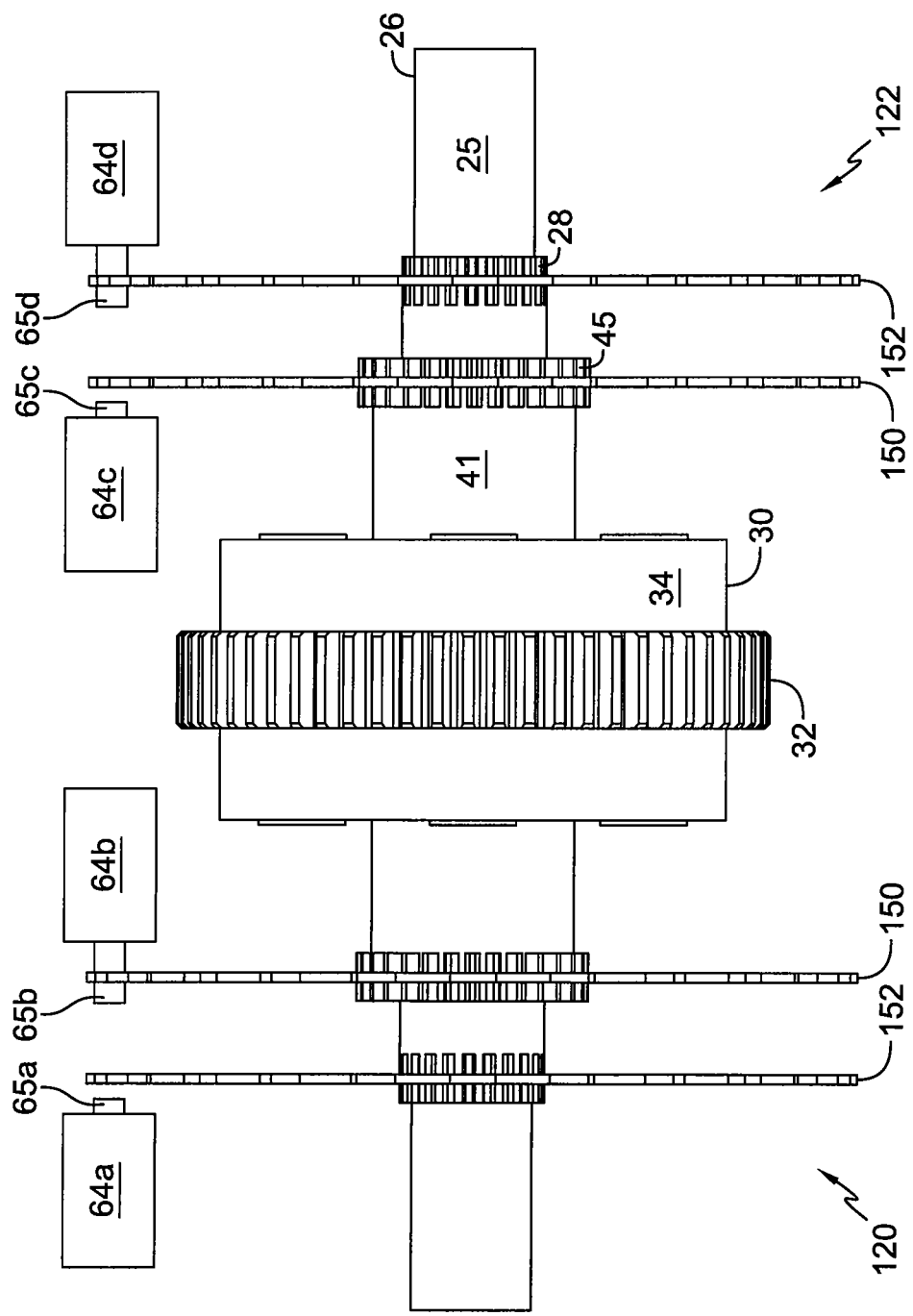
FIG. 11 depicts a front-end view of a second embodiment of the present invention in the steering position, as more fully described below.

An operator may also use the independent control of solenoids 64a-d to turn a vehicle. As shown in FIG. 11, drive plate 150 located in brake clutch assembly 120 may be engaged by plunger 65b. At the same time brake plate 152 located in brake clutch assembly 122 may be engaged by plunger 65d. Thus, brake clutch assembly 120 will cause one side of vehicle 100 to drive, while brake clutch assembly 122 will cause the other side of vehicle 100 to brake. This dichotomy will cause vehicle 100 to rotate or pivot about wheel 16 that is drivingly connected to brake clutch assembly 122, thus steering the vehicle. It will be appreciated by those in the art that engaging brake plate 152 in brake clutch assembly 120 and drive plate 150 in drive clutch assembly 122 in a fashion similar to that described above will cause vehicle 100 to rotate or pivot about wheel 16 that is drivingly connected to brake clutch assembly 120, thus turning or steering in the opposite direction.

Figure 12:
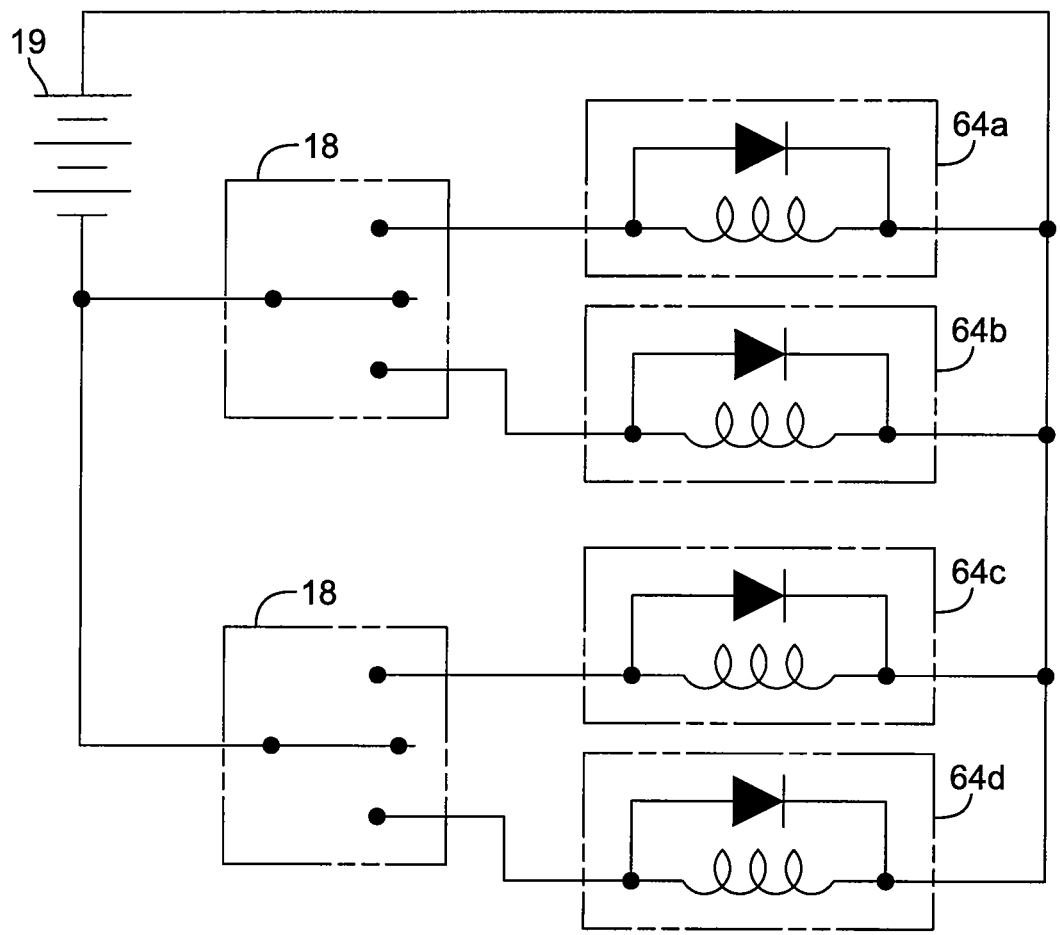
FIG. 12 depicts an exemplary electrical schematic of a second embodiment of the present invention.

There are a variety of methods that may be used to control solenoids 64a-d. FIG. 12 depicts an electrical schematic of a circuit that may be used to control solenoids 64a-d. Mechanisms 18 are in the form of switches. An operator may position each switch 18 to control solenoids 64a-d, causing plungers 65a-d to move among the various positions described above, some of which are shown in FIGS. 9 to 11. For example, the positions of switches 18 shown in FIG. 12 may correspond to the positions of plungers 65 a-d shown in FIG. 9.

Figure 13:
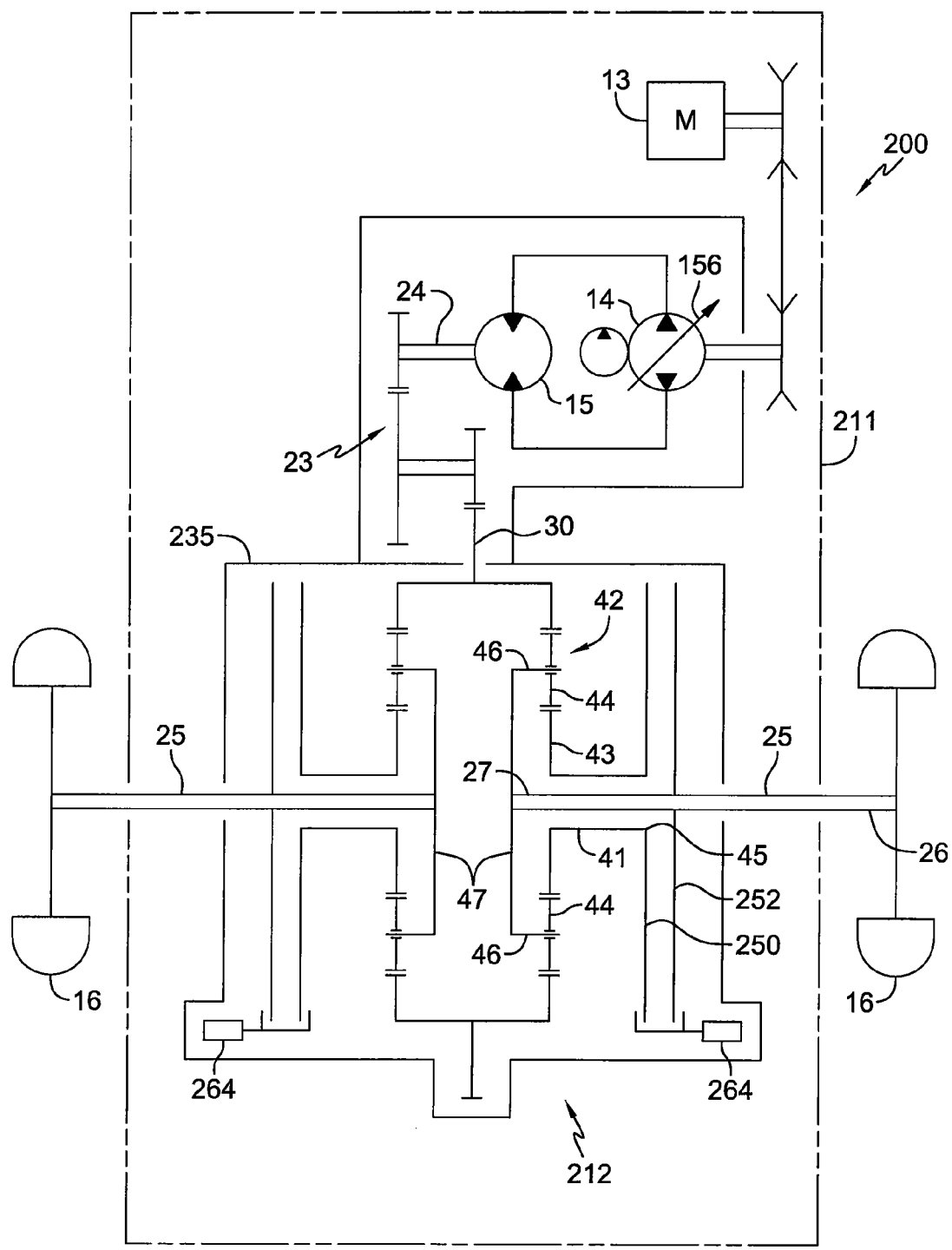
FIG. 13 depicts a schematic of an exemplary vehicle comprising a third embodiment of the present invention.
Figure 14:
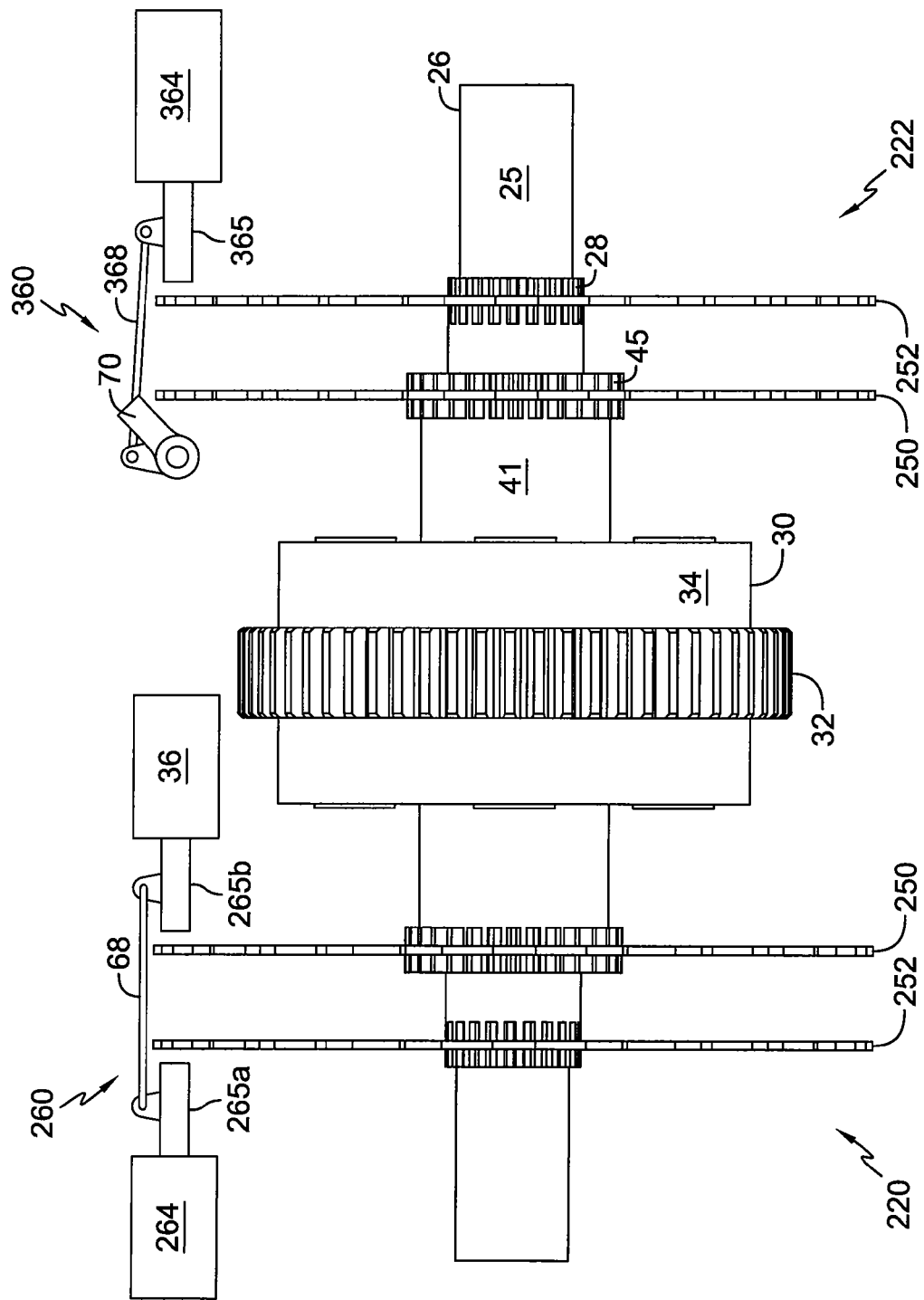
FIG. 14 depicts a front-end view of a third embodiment and a fourth embodiment of the present invention in the neutral position, as more fully described below.
Figure 15:
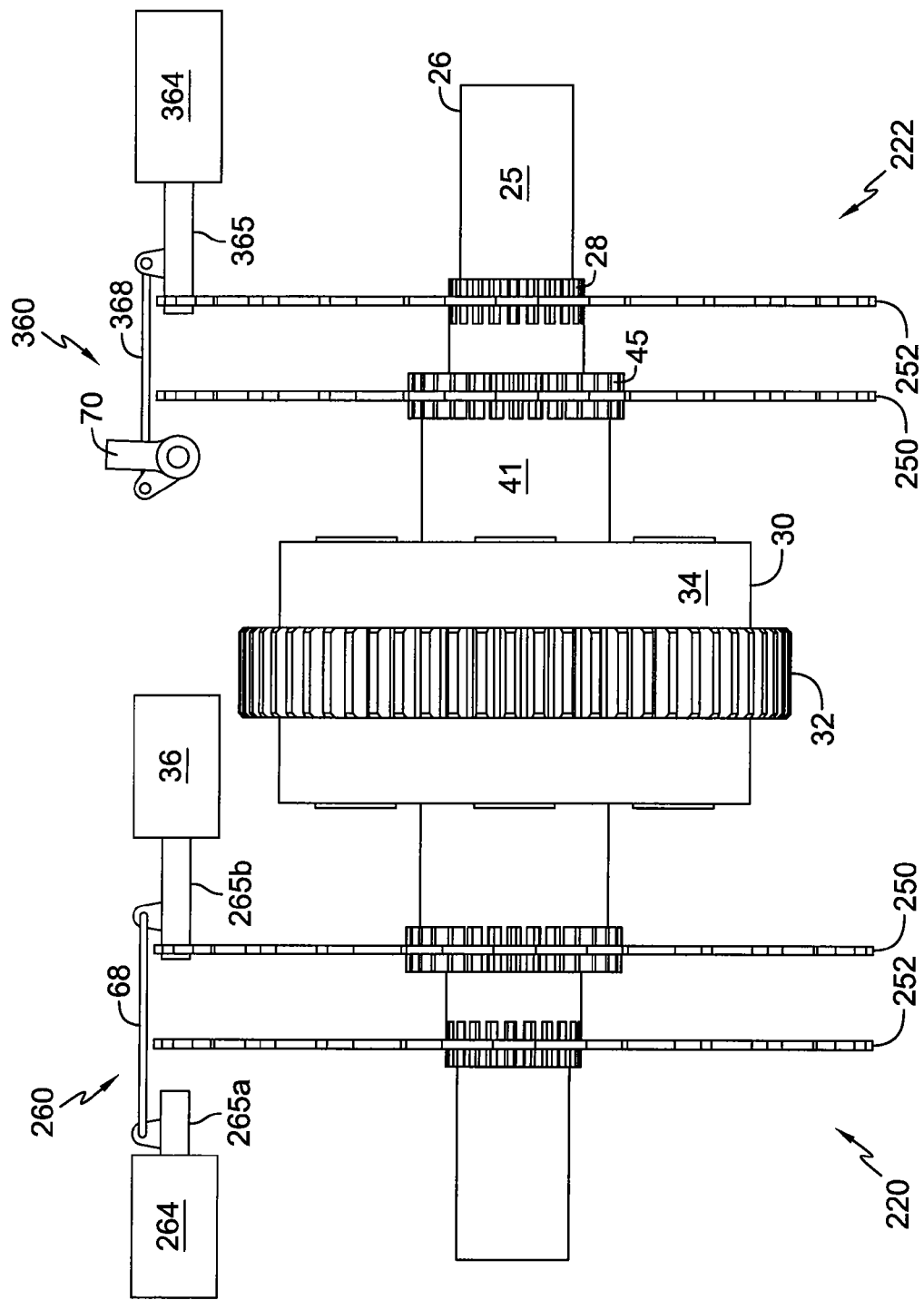
FIG. 15 depicts a front-end view of a third embodiment and a fourth embodiment of the present invention in a steering position, as more fully described below.

FIG. 13 depicts a third embodiment of the present invention, in which planet brake differential 212 is located in differential housing 235, which is positioned on frame 211 of vehicle 200. FIGS. 14 and 15 also depict the third embodiment of the present invention engaged to brake clutch assembly 220. In this embodiment, actuator assembly 260 comprises a single actuator mechanism 264. Actuator 264 is a bidirectional mechanism. Actuator 264 may be a bidirectional solenoid, a bidirectional hydraulic cylinder, or other bidirectional actuation mechanism. Actuator assembly 260 is movable among a first position, in which actuator assembly 260 is disengaged from brake plate 252 and engaged to drive plate 250, a second position, in which actuator assembly 260 is disengaged from both brake plate 252 and drive plate 250, and a third position, in which actuator assembly 260 is engaged to brake plate 252 and disengaged from drive plate 250.

In the depicted embodiment, actuator assembly 260 further comprises plunger 265a, which is moved by actuator 264. Plunger 265a is connected to plunger 265b, which may be supported by bearing 36, through linkage 68. In this manner, when plunger 265a is moved in a direction, plunger 265b will move in the same direction, and by the same amount. By way of example, FIG. 14 depicts the second position of actuator assembly 260, in which plunger 265a is disengaged from brake plate 252 and plunger 265b is disengaged from drive plate 250. When actuator assembly 260 moves from the second position to the first position, plunger 265a moves toward actuator 264 (which equates to left in FIGS. 14 and 15), pulling linkage 68, which in turn pulls plunger 265b. In this manner, plunger 265b would then engage drive plate 250 of brake clutch assembly 220, as shown in FIG. 15. It will be appreciated by those in the art that when actuator assembly 260 moves from the third position to the second position, the components of actuator assembly 260 will move in the same manner as when actuator assembly 260 moves from the second position to the first position.

When actuator assembly 260 moves from the second position to the third position, plunger 265a moves away from actuator 264 (which equates to right in FIGS. 14 and 15), pushing linkage 68, which in turn pushes plunger 265b. In this manner, plunger 265a would then engage brake plate 252. It will be appreciated by those in the art that when actuator assembly 260 moves from the first position to the second position, it behaves in the same manner as when it moves from the second position to the third position.

A fourth embodiment of the present invention is shown engaged to brake clutch assembly 222 of FIGS. 14 and 15. In this embodiment, actuator assembly 360 comprises a single actuator mechanism 364. Actuator 364 is a bidirectional mechanism. Actuator 364 may be a bidirectional solenoid, a bidirectional hydraulic cylinder, or other bidirectional actuation mechanism. Actuator assembly 360 is moveable among a first position, in which actuator assembly 360 is disengaged from brake plate 252 and engaged to drive plate 250, a second position, in which actuator assembly 360 is disengaged from both brake plate 252 and drive plate 250, and a third position, in which actuator assembly 360 is engaged to brake plate 252 and disengaged from drive plate 250.

In the depicted embodiment, actuator assembly 360 further comprises plunger 365, which is moved by actuator 364. Plunger 365 is connected to engaging mechanism 70 through linkage 368. In this manner, movement of plunger 365 to the left in FIGS. 14 and 15 causes engagement mechanism 70 to rotate counter-clockwise. Likewise, movement of plunger 365 to the right in FIGS. 14 and 15 will cause engagement mechanism 70 to rotate clock-wise. By way of example, FIG. 14 depicts the second position of actuator assembly 360, in which plunger 365 is disengaged from brake plate 252 and engagement mechanism 70 is disengaged from drive plate 250. When actuator assembly 360 moves from the second position to the first position, plunger 365 moves toward actuator 364 (which equates to right in FIGS. 14 and 15), pulling linkage 368, which in turn rotates engagement mechanism 70 clockwise. In this manner, engagement mechanism 70 would then engage drive plate 250 of brake clutch assembly 222, as shown in FIG. 15. It will be appreciated by those in the art that when actuator assembly 360 moves from the third position to the second position, the components of actuator assembly 360 will move in the same manner as when actuator assembly 360 moves from the second position to the first position.

When actuator assembly 360 moves from the second position to the third position, plunger 365 moves away from actuator 264 (which equates to left in FIGS. 14 and 15), pushing linkage 68, which in turn rotates engagement mechanism 70 counter-clockwise. In this manner, plunger 365 would then engage brake plate 252. It will be appreciated by those in the art that when actuator assembly 360 moves from the first position to the second position, the components of actuator assembly 360 will move in the same manner as when actuator assembly 360 moves from the second position to the third position.

Figure 16:
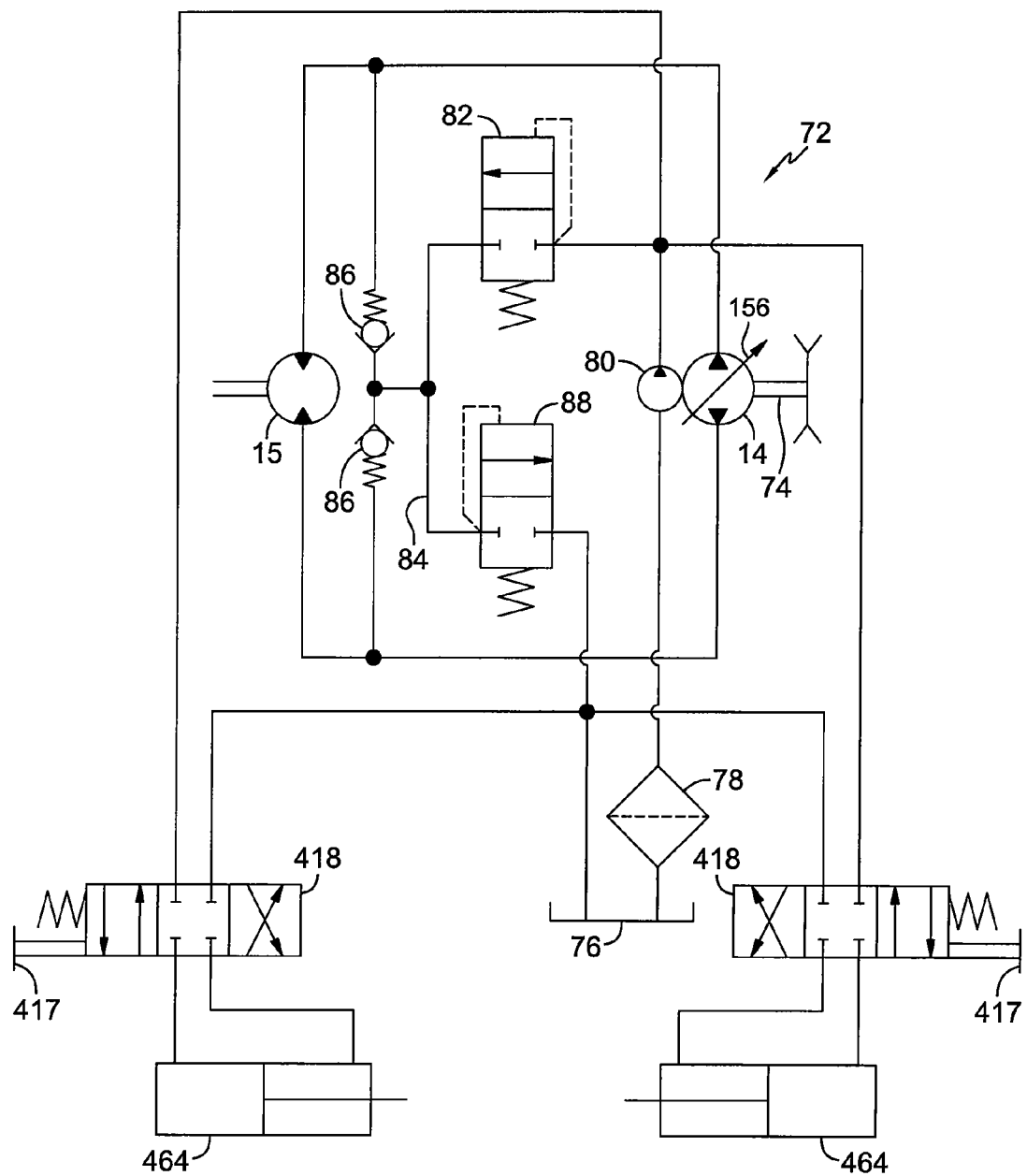
FIG. 16 depicts a hydraulic schematic of a fifth embodiment of the present invention.

As previously noted, the actuator mechanisms, for example actuator 64 and actuator 264, may be a variety of mechanisms. One exemplary actuator mechanism was described as a solenoid. Another exemplary actuator mechanism is depicted in FIG. 16 as the fifth embodiment of the present invention. Pump 14 and motor 15 and the hydraulic connections between them form a generally closed hydraulic circuit. Such connections may be hydraulic lines or may be fluid passages in a center section or housing. Input shaft 74 is driven either directly by a mechanism such as a flywheel connection, shaft or other direct drive devices or indirectly by a mechanism such as a belt, chain or other indirect drive devices. As input shaft 74 rotates, it may also drive a charge or auxiliary pump 80. Pump 80 then pulls fluid from a reservoir 76. Reservoir 76 may be located in a variety of locations known in the art.

Fluid may be pulled into pump 80 through a filter 78. Pump 80 may then provide pressurized fluid to control valves 418. An operator may actuate valves 418 by using operator controls 417. Fluid will then be directed to and from hydraulic actuators 464 to engage the drive plates and brake plates as previously described.

FIG. 16 shows other features that may be present in some hydraulic circuits. Auxiliary relief valve 82 may release excess hydraulic fluid to a charge gallery 84. This excess hydraulic fluid is then accessible to check valves 86. Excess fluid from charge gallery 84 may be returned to reservoir 76 through charge relief valve 88.

Figure 17:
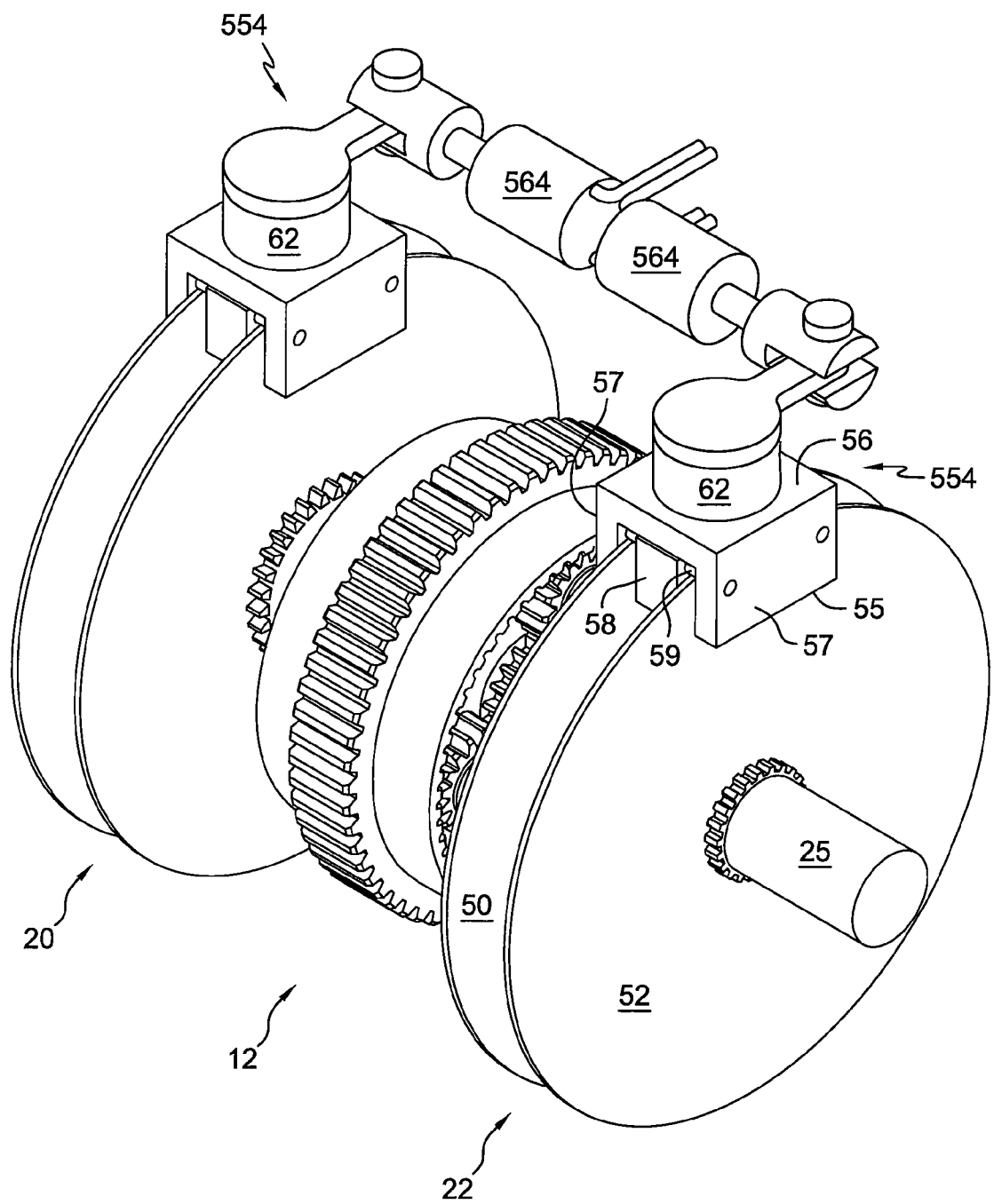
FIG. 17 depicts a perspective view of a sixth embodiment of the present invention.

FIG. 17 depicts a sixth embodiment of the present invention. This embodiment is similar to the embodiment shown in FIGS. 1 to 6, except that bidirectional actuators 564 function in a manner similar to the actuators described above, and are connected to and move each engagement assembly 554.

Figure 18:
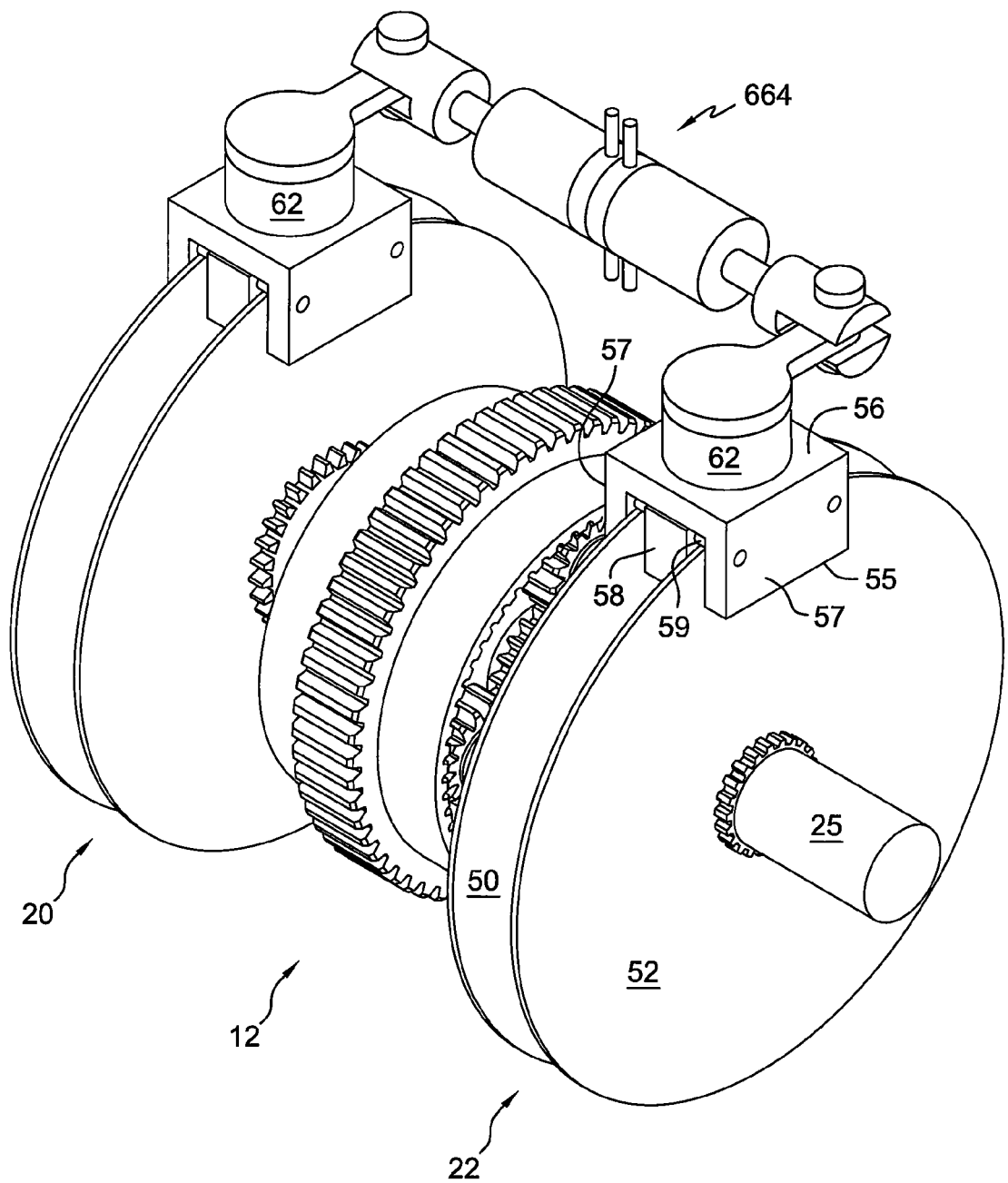
FIG. 18 depicts a perspective view of a seventh embodiment of the present invention.

FIG. 18 depicts a seventh embodiment of the present invention. This embodiment is similar to the embodiment shown in FIGS. 1 to 6 and the embodiment shown in FIG. 17, except that bidirectional actuator 664 is a single assembly that may provide some convenience in the manufacture of the various embodiments.

Figure 19:
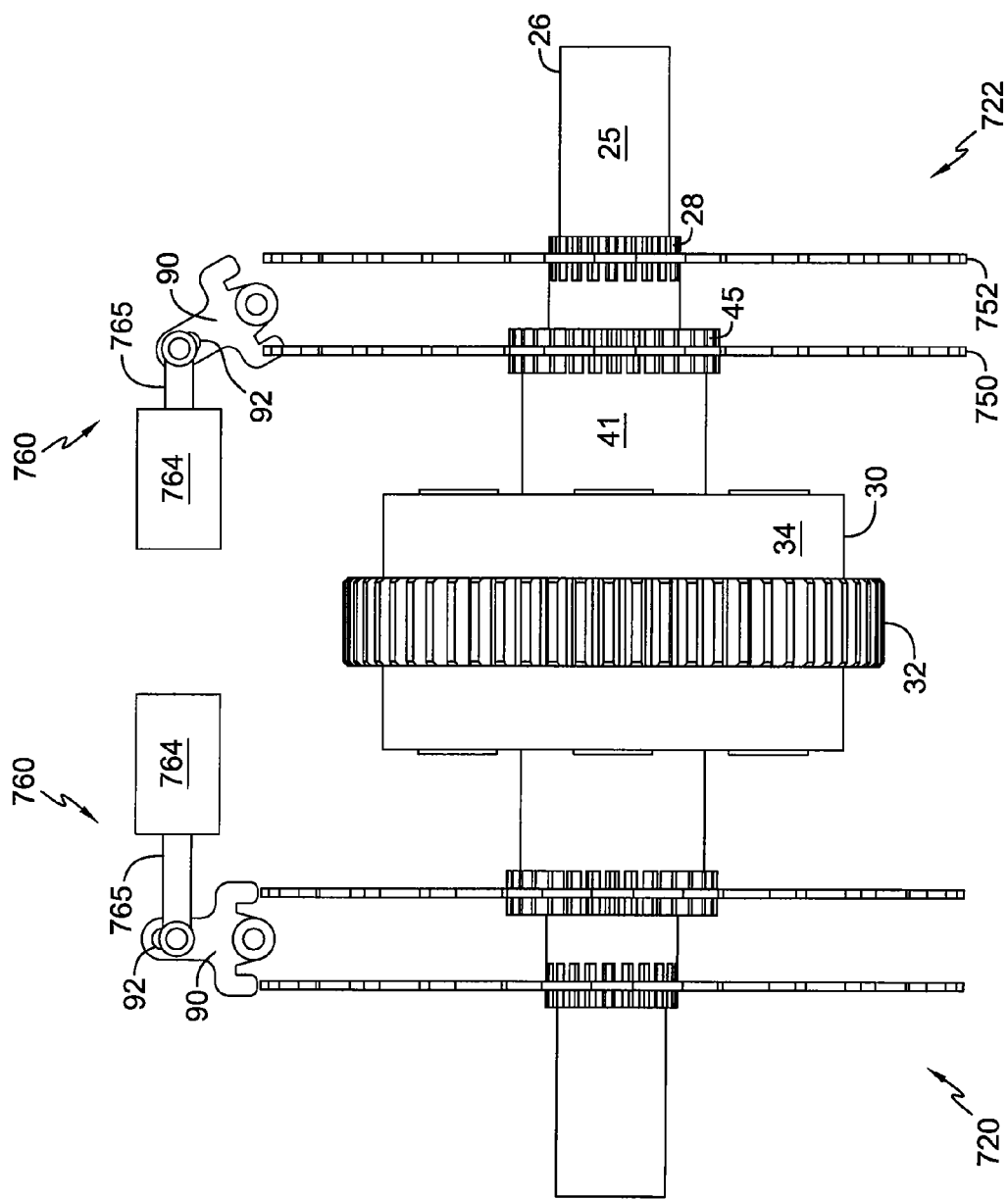
FIG. 19 depicts a front-end view of an eighth embodiment of the present invention with one portion in a neutral position and a second portion in the drive position, as more fully described below.

FIG. 19 depicts an eighth embodiment of the present invention. Actuator assembly 760 comprises a bidirectional actuator 764, which is connected to a pivot mechanism 90. Movement of plunger 765 causes pivot mechanism 90 to rotate, permitting engagement of either drive plate 750 or brake plate 752, or disengagement of both drive plate 750 and brake plate 752 to permit a freewheel condition of brake clutch assembly 720 and brake clutch assembly 722. It will be appreciated by those in the art that, in order to allow the linear movement of plunger 765 to cause rotation of pivot mechanism 90, each plunger 765 engages each pivot mechanism 90 at slot 92.

Each of the previous embodiments discloses various methods of engaging a brake plate and a drive plate, which may be called a clutch plate. In some configurations it may be desirable to provide additional support for the various plungers and other engagement mechanisms disclosed herein. Such support may be formed in a housing, a bracket, a bearing, or other support mechanism. Selecting the proper support to assure adequate life and performance of these mechanisms is an established engineering function.

Figure 20:
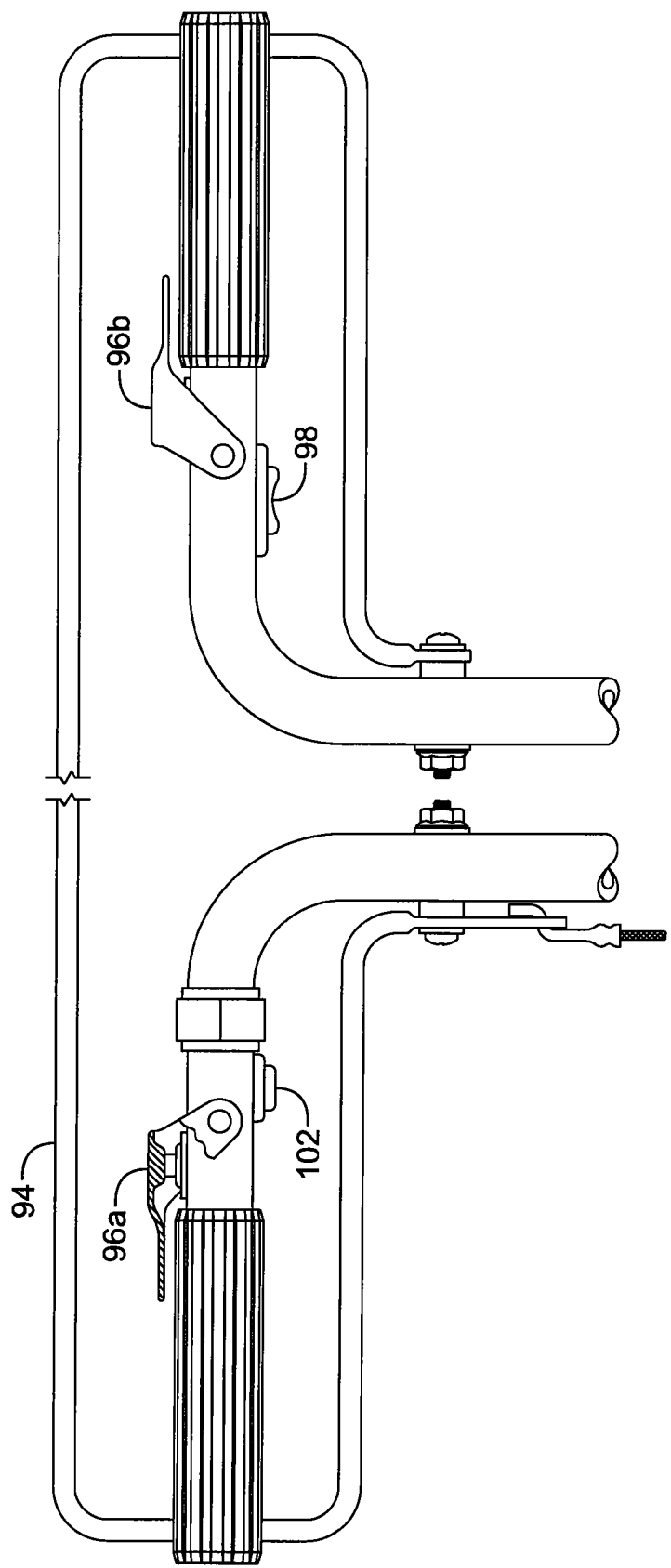
FIG. 20 depicts an elevational view of first control embodiment of the present invention.

FIG. 20 depicts a first control embodiment of the present invention. A bail 94 may be used to engage or disengage a power take off that may drive a snow thrower auger, brush cutter, mower deck, sweeper brush, tiller, or other powered device (none of which are shown). Switch mechanisms 96a and 96b may be configured so that actuation of only one switch mechanism 96a or 96b will cause engagement of both drive plates. Alternatively, switch mechanisms 96a and 96b may be configured so that actuation of both switch mechanisms 96a and 96b is required to cause engagement of both drive plates.

Steering switch 98 may be employed with any of the embodiments described herein to steer a vehicle. By way of example, and as described in detail below, sliding steering switch 98 to the right in FIG. 20 will cause the vehicle to turn to the right, while sliding steering switch 98 to the left will cause the vehicle to turn to the left. Steering switch 98 may be biased to require an operator to hold steering switch 98 in a steering position in order to effectuate the steering. Release of steering switch 98 by an operator will cause the bias on steering switch 98 to move steering switch 98 to the non-steer position, shown in FIG. 20.

In order to brake the vehicle on which the first control embodiment is used, brake switch 102 may be provided. Brake switch 102 has two stable positions, a brake position and a drive position. When brake switch 102 is in the drive position, operator switches 96a and 96b and steering switch 98 are operational and work as described above. When brake switch 102 is in the brake position, the brake plates previously described are engaged, and operator switches 96a and 96b and steering switch 98 are disabled.

Figure 21:
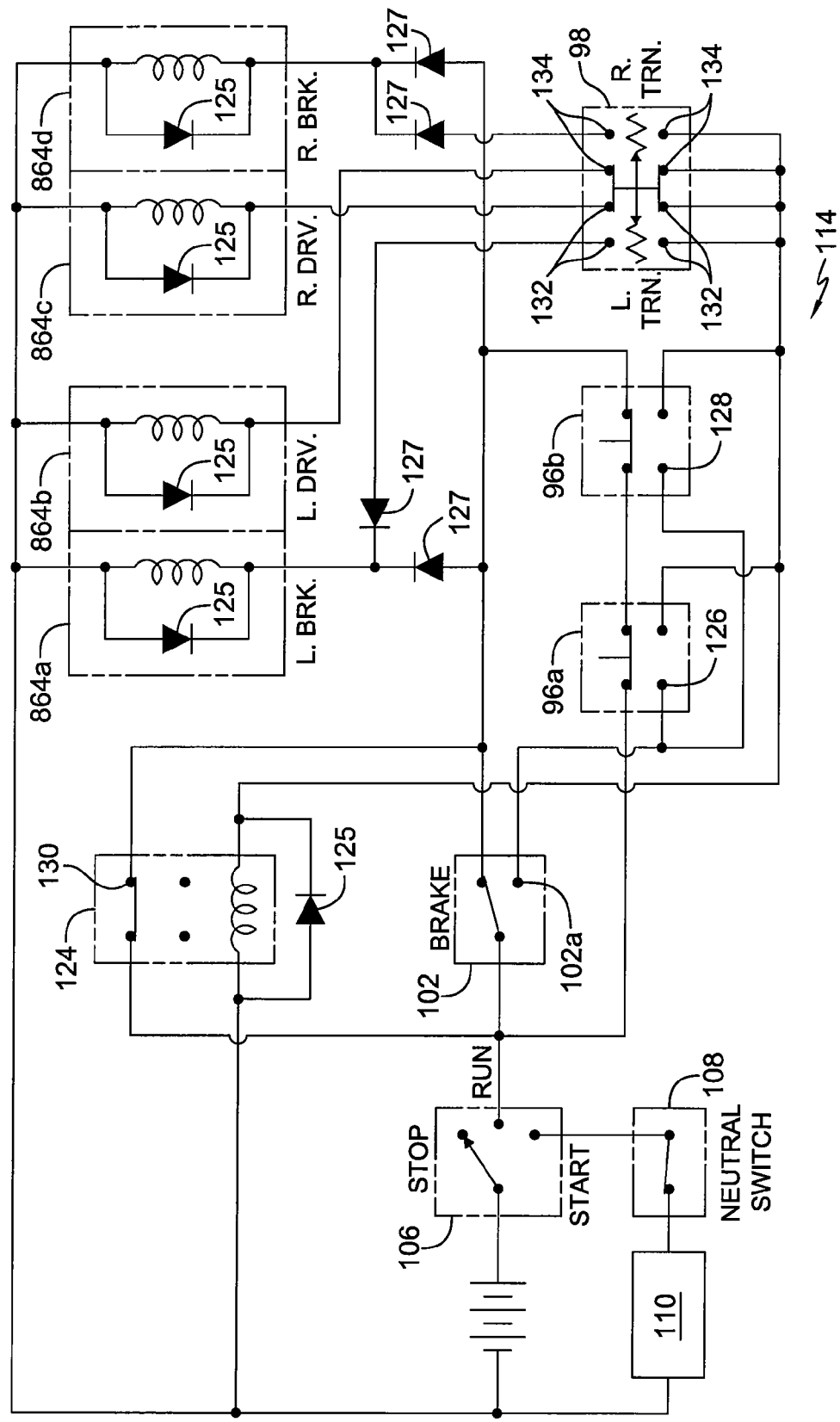
FIG. 21 depicts a first exemplary electrical schematic of the first control embodiment of the present invention.

FIG. 21 depicts a first exemplary schematic that may be associated with the first control embodiment of FIG. 20. An ignition switch 106 may have positions corresponding to prime mover start, prime mover run, and prime mover stop. A transmission or transaxle neutral switch 108 may be located as part of a start circuit or start enable circuit 110. Neutral switch 108 will only permit start of a prime mover when the hydrostatic transmission, or whatever vehicle drive mechanism is employed with the vehicle, is in a neutral position or its equivalent. When ignition switch 106 is in the run position and brake switch 102 is in the position shown in FIG. 21, which corresponds to brakes on, solenoid 864a and solenoid 864d will be actuated, which will cause the engagement of the brake plates as described above to be actuated as previously described. In the depicted embodiment, brake switch 102 has priority over the portions of circuit 114 that relate to the operations of solenoids 864b and 864c. Thus, when brake switch 102 is actuated, which is the position shown in FIG. 21, power is removed from the portions of all operator controls capable of actuating drive solenoids 864b and 864c.

Movement of brake switch 102 to contact 102a will enable operator control of solenoids 864b and 864c. Actuation of either switch 96a or switch 96b causes engagement of drive solenoids 864b and 864c. In a particular embodiment, an optional brake disable relay 124 is provided in parallel with switches 96a and 96b, which maintains a closed circuit condition until switches 96a and 96b have been completely actuated. This prevents a potentially undesirable condition caused by the brief open circuit before the switches 96a and 96b have been completely actuated, as will now be described. Switch 96a and switch 96b are biased to the position shown in FIG. 21, preferably by spring loading. As a mechanical force is initially applied to either switch 96a or 96b against the bias, an open condition is created in the respective switch until actuation is completed, i.e., until switch 96a is positioned to contacts 126 or switch 96b is positioned to contacts 128. Thus, during this intermediate open switch condition, drive solenoids 864b and 864c are not yet engaged, and without use of the optional brake disable relay 124, brake solenoids 864a and 864d would be released. The brake disable relay 124 is in a normally closed configuration and therefore maintains a closed circuit to brake solenoids 864a and 864d during this intermediate open switch condition. When switch 96a ultimately engages contacts 126 or when switch 96b ultimately engages contacts 128, relay 124 is actuated at the same time solenoids 864b and 864c are engaged. Upon actuation of relay 124, contacts 130 open, thereby removing power from brake solenoids 864a and 864d at the same time power is applied to drive solenoids 864b and 864c.

Steering switch 98 is provided in parallel to the switches 96a and 96b and the relay 124. Switch 98 serves to cause engagement of both a drive solenoid and a brake solenoid simultaneously to effect steering in a particular direction. For example, steering to the left may be accomplished by moving switch 98 to the left, which closes contacts 132 shown in FIG. 21. This provides power to and actuates left brake solenoid 864a and right drive solenoid 864c, which causes a vehicle, such as vehicle 180 shown in FIG. 27, to turn to the left. An operator may move switch 98 back to the center or non-steering position after the desired length of left turning has been completed or an optional bias may move switch 98 to the center or non-steering position when an operator releases steering switch 98. A right turn may be similarly accomplished by moving switch 98 to the right to close contacts 134. This provides power to and actuates left drive solenoid 864b and right brake solenoid 864d, which causes a vehicle, such as vehicle 180 shown in FIG. 27, to turn to the right.

There are diodes located throughout circuit 114. Diodes 125 provide a discharge path for the adjacent coil. Diodes 127 prevent any discharge current from the brake solenoids from being directed back into circuit 114.

Figure 22:
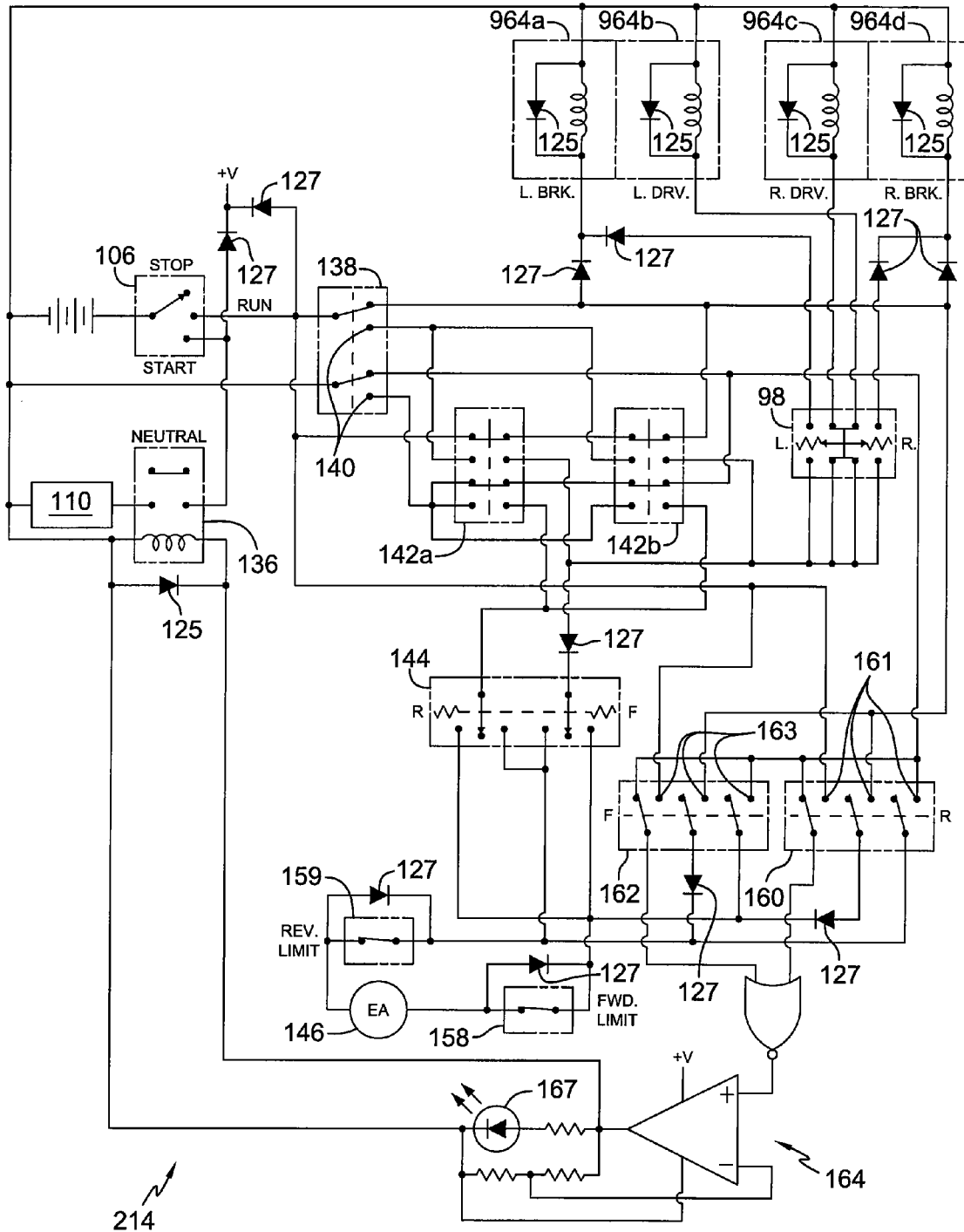
FIG. 22 depicts a second exemplary electrical schematic of the first control embodiment of the present invention.

FIG. 22 depicts a second exemplary schematic that may be associated with the first control embodiment of FIG. 20. In the run position, ignition switch 106 provides power to brake switch 138. In the position shown in FIG. 22, which equates to the braking of the vehicle, brake switch 138 actuates brake solenoids 964a and 964d as well as providing power to switch 160 and switch 162. The purpose of switch 160 and switch 162 will be discussed in more detail below.

Movement of brake switch 138 to engage contacts 140 enables operator control of the steering, braking and drive functions of circuit 214. A voltage signal is sent from brake switch 138 to switch 142a and switch 142b. Actuation of either switch 142a or switch 142b may enable a plurality of functions, including drive, steering and adjustment of a transmission or transaxle output speed.

Switch 142a and switch 142b drive solenoids 964b and 964c and are in parallel with steering switch 98. Steering switch 98 functions as previously described, selectively actuating solenoids 964a, 964b, 964c and 964d to provide drive and steering functions.

Switch 142a and switch 142b are in communication with control switch 144, which is in communication with electric actuator 146. Electric actuator 146 may also be seen attached to transaxle 148 in FIG. 23. Electric actuator 146 may be directed to adjust the speed of transaxle 148. Electric actuator 146 may also be used to direct transaxle 148 in both forward and reverse. Transaxle 148 is a variable type transaxle or transmission that may be similar to the mechanisms depicted in FIG. 1 and FIG. 7. Electric actuator 146 may be attached to a control arm 155 or may be connected to an internal adjustment mechanism such as swash plate 156.

Forward limit switch 158 limits the forward range of motion of electric actuator 146 and control arm 155 and thus swash plate 156. Similarly, reverse limit switch 159 limits the reverse range of motion of electric actuator 146 and control arm 155.

In certain circumstances it may be desirable to provide for automatic return to neutral of electric actuator 146. Such circumstances may include operator actuation of brake switch 138 or operator release of both switches 142a and 142b, which are biased to the position shown in FIG. 22 and which function as "dead man" switches. To assure an automatic return to neutral, switch 160 and switch 162 may be provided. Moving switch 138 from contacts 140 to the position shown in FIG. 22 will provide a signal to switch 160 and switch 162. If transaxle 148 is in a forward condition, switch 162 will close, and move from the position shown in FIG. 22 to contacts 163, which will provide a circuit path to electric actuator 146. If transaxle 148 is in a reverse condition, switch 160 will close, and move from the position shown in FIG. 22 to contacts 161, which will also provide a circuit path to electric actuator 146. The signal from switch 138 will be transmitted through closed switch 160 or closed switch 162 to drive electric actuator 146 to a neutral position, at which time the closed switch 160 or 162 will become open (the position shown in FIG. 22) and movement of electric actuator 146 will cease.

Figure 23:
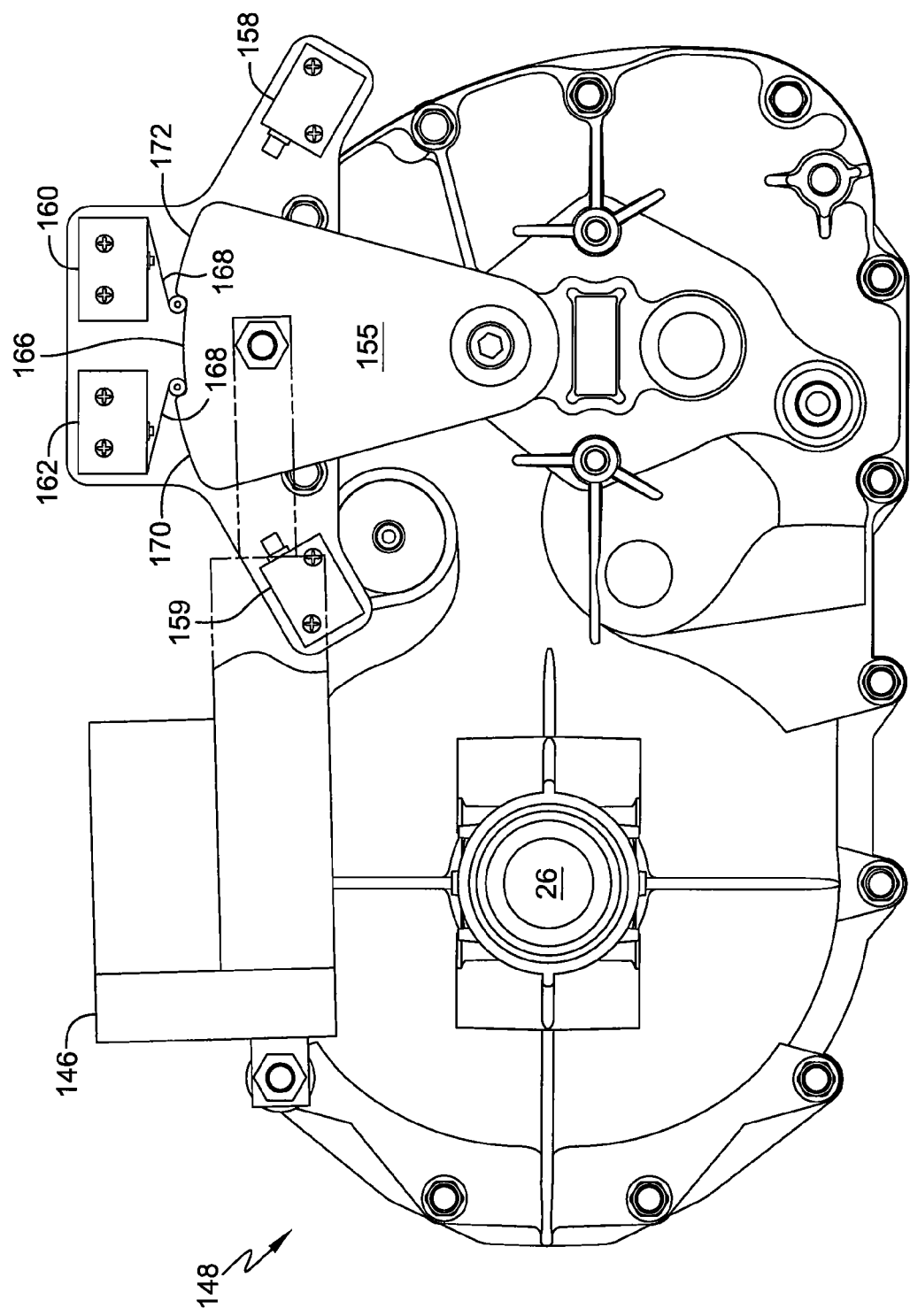
FIG. 23 depicts an elevational view of a hydrostatic transaxle showing an exemplary control arm and actuator mechanism of the first control embodiment of the present invention.

Switch 160 and switch 162 may be positioned in a plurality of locations. These switches may be part of electric actuator 146, associated with swash plate 156, associated with an internal control arm (not shown), associated with an external control arm 155, or other places that have movement associated with the position of swash plate 156. As depicted in FIG. 23, actuators 168 of switch 160 and switch 162 are positioned in a recess 166, indicating a neutral condition of control arm 155. When control arm 155 moves in a forward direction from neutral, actuator 168 of switch 162 will be depressed by peripheral surface 170 of control arm 155, actuating switch 162. When control arm 155 moves in a reverse direction from neutral, actuator 168 of switch 160 will be depressed by peripheral surface 172 of control arm 155, actuating switch 160.

An automatic return to neutral function may also be initiated by an operator's release of switch 142a and switch 142b, which serves to indicate the operator is no longer present. In the position shown in FIG. 22, switch 142a and switch 142b will direct a signal to brake solenoids 964a and 964d and to switch 160 and switch 162, moving electric actuator 146 to neutral if either switch 160 or switch 162 is closed.

Circuit 214 may include other optional functions. For example, switch 160 and switch 162 may direct a signal to amplifier circuit 164. Amplifier circuit 164 may provide power to a neutral indicating device such as LED 167. Circuit 214 may also contain a device to permit start of a prime mover only when transaxle 148 is in neutral. Relay 136 is actuated only when switch 160 and switch 162 are in the position shown in FIG. 22, which indicates that transaxle 148 is in neutral, and when brake switch 138 is in the position shown in FIG. 22, which indicates that brake solenoid 964a and brake solenoid 964d will be actuated when power is applied through ignition switch 106. Power routed through ignition switch 106 in the start position will send a signal through relay 136 to circuit 110, which permits a prime mover to be enabled or started.

Figure 24:
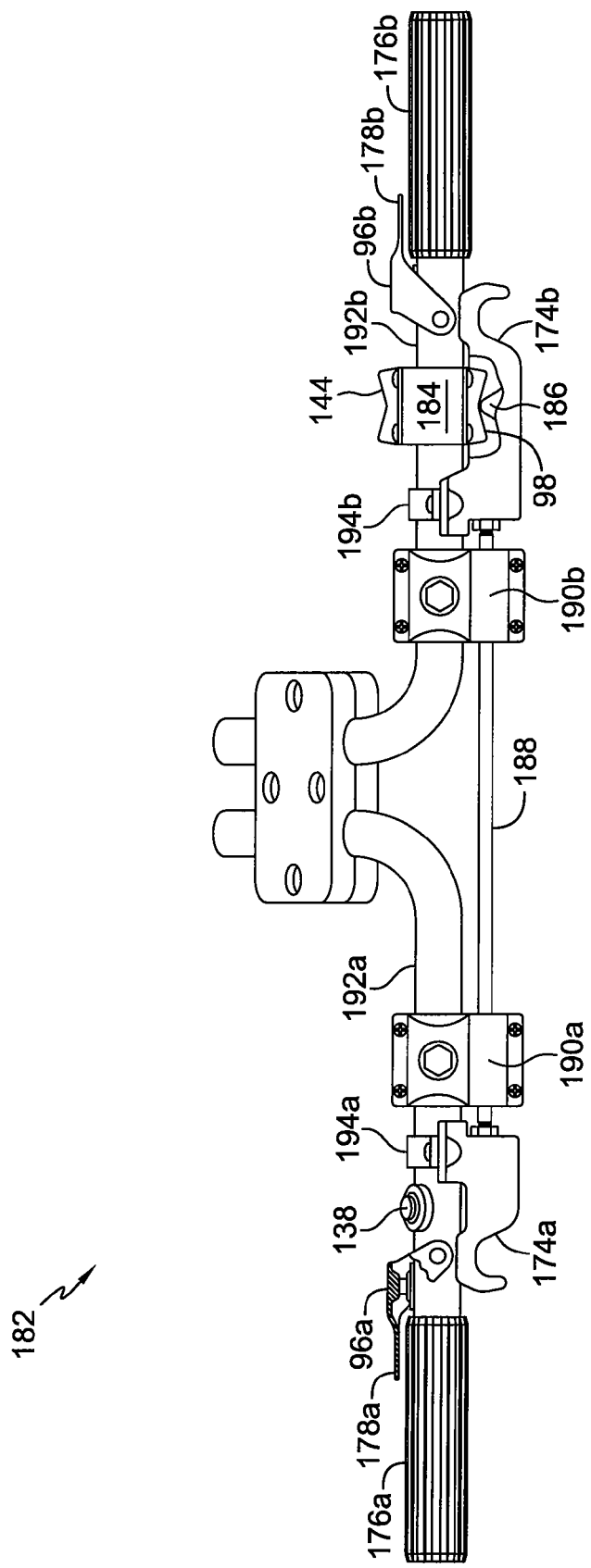
FIG. 24 depicts a plan view of a second control embodiment of the present invention.
Figure 25:
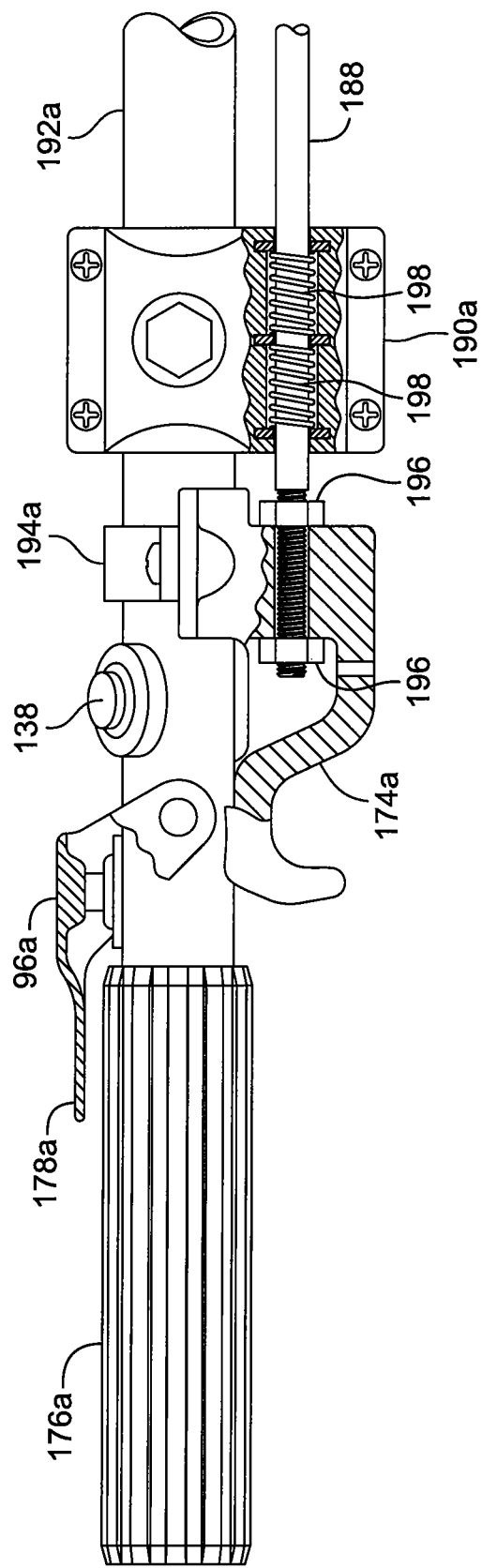
FIG. 25 depicts an enlarged view of a first portion of the second control embodiment of the present invention with a portion of the mechanism sectioned.
Figure 26:
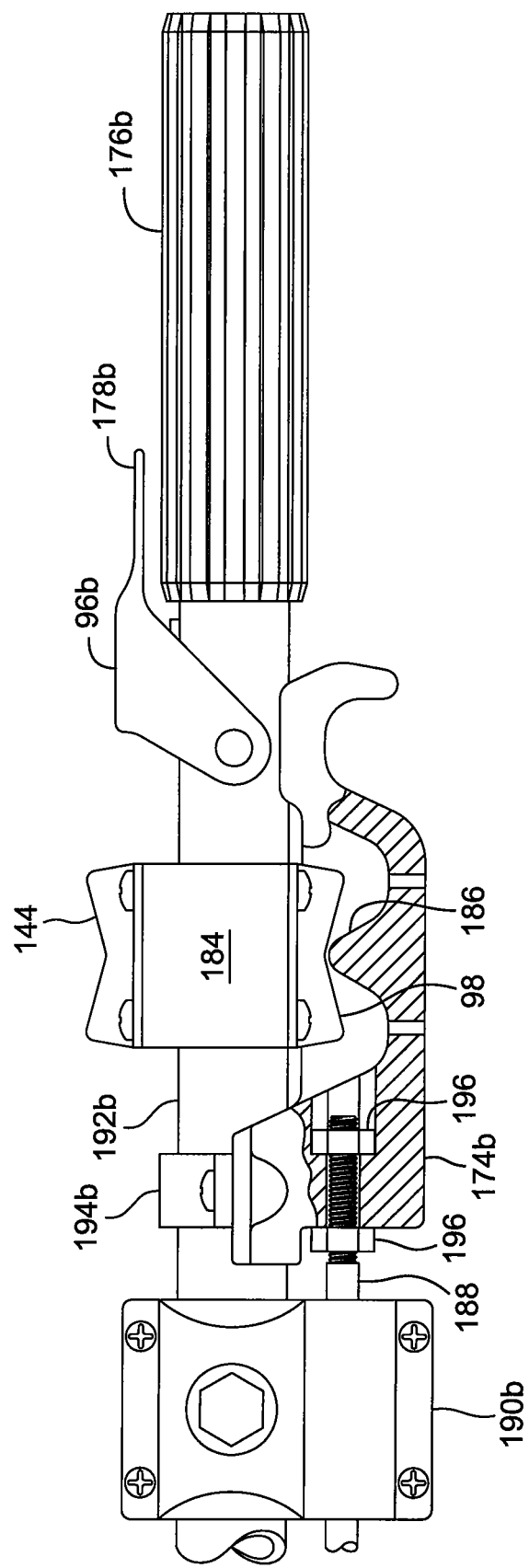
FIG. 26 depicts an enlarged view of a second portion of the second control embodiment of the present invention with a portion of the mechanism sectioned.

FIGS. 24 to 26 depict a second control embodiment of the present invention. It may be advantageous in some vehicles to be able to steer a vehicle using either the right hand or the left hand. The control embodiment depicted in FIG. 24 permits steering control with either hand.

Operator switch 96a and operator switch 96b are positioned adjacent to handles 176a and 176b so that an operator may comfortably grip handles 176 as well as the actuators of switch 96a and switch 96b. Portions 178a and 178b may be provided on the actuators of switch 96a and switch 96b, respectively, to further improve operator comfort. Portions 178a and 178b may have relatively thin cross sections so that an operator's hand may comfortably actuate switch 96a and simultaneously grip handle 176a or actuate switch 96b and simultaneously grip handle 176b.

Other controls may be positioned for ease of operation. Brake switch 138 may be positioned on the left side of handle assembly 182. Drive control switch 144, used to control a mechanism such as actuator 146, may be positioned as a part of switch assembly 184, which in FIG. 24 appears on the right side of handle assembly 182. Steering switch 98 may also be positioned on the right side of handle assembly 182 as part of switch assembly 184.

It may be desirable to permit one-handed operation of a vehicle. Switch 96a and switch 96b may be configured to permit actuation of drive solenoid 964b and drive solenoid 964c with actuation of either switch, as depicted by the schematics of FIGS. 21 and 22. Steering from either side of handle 182 is similarly desirable. While such steering may be accomplished by the addition of another switch similar to switch 98, steering may also be accomplished as shown in FIGS. 24 to 26.

Finger slide 174b is positioned on the right side of handle assembly 182. Protrusion 186 may be formed as part of finger slide 174b. An operator may push finger slide 174b to the left or pull finger slide 174b to the right, causing protrusion 186 to move along switch 98. This movement will cause switch 98 to actuate to the left or to the right, effectuating steering of a vehicle, as has been previously described. In order to permit operation of switch 98 from the left side of handle assembly 182, a connecting rod 188 connects finger slide 174b to finger slide 174a. Connecting rod 188 may be slidingly supported by bracket 190a and bracket 190b.

Finger slide 174a and finger slide 174b may be slidingly supported on handle 192a by a bracket 194a. Bracket 194a may be formed to generally conform to the shape of handle 192a. Finger slide 174a may also be shaped to generally conform to the shape of handle 192a. The dimensions of bracket 194a and finger slide 174a are chosen so that when bracket 194a is attached to finger slide 174a these components slide freely on handle 192a.

Finger slide 174a and bracket 194a may be formed of plastic or metal. If finger slide 174a or bracket 194a is formed of metal, they may need to be treated to reduce corrosion to permit sliding movement on handle 192a after exposure to moisture. Handle 192a may also be similarly treated. An appropriate lubricant may also be used between finger slide 174a, bracket 194a and handle 192a. This discussion is similarly applicable to finger slide 174b, bracket 194b and handle 192b.

The distance between each finger slide 174 and the adjacent support bracket 190 may be kept as short as possible while permitting the range of motion necessary to actuate switch 98. Connecting rod 188 may be attached to finger slide 174a and finger slide 174b by a variety of techniques, including retention by nuts 196.

Connecting rod 188 may be biased to move finger slide 174a and finger slide 174b to a non-steering position when an operator releases both finger slide 174a and finger slide 174b. The bias of connecting rod 188 to this position may be accomplished by a plurality of springs 198 retained in bracket 190a or bracket 190b or both bracket 190a and bracket 190b.

Figure 27:
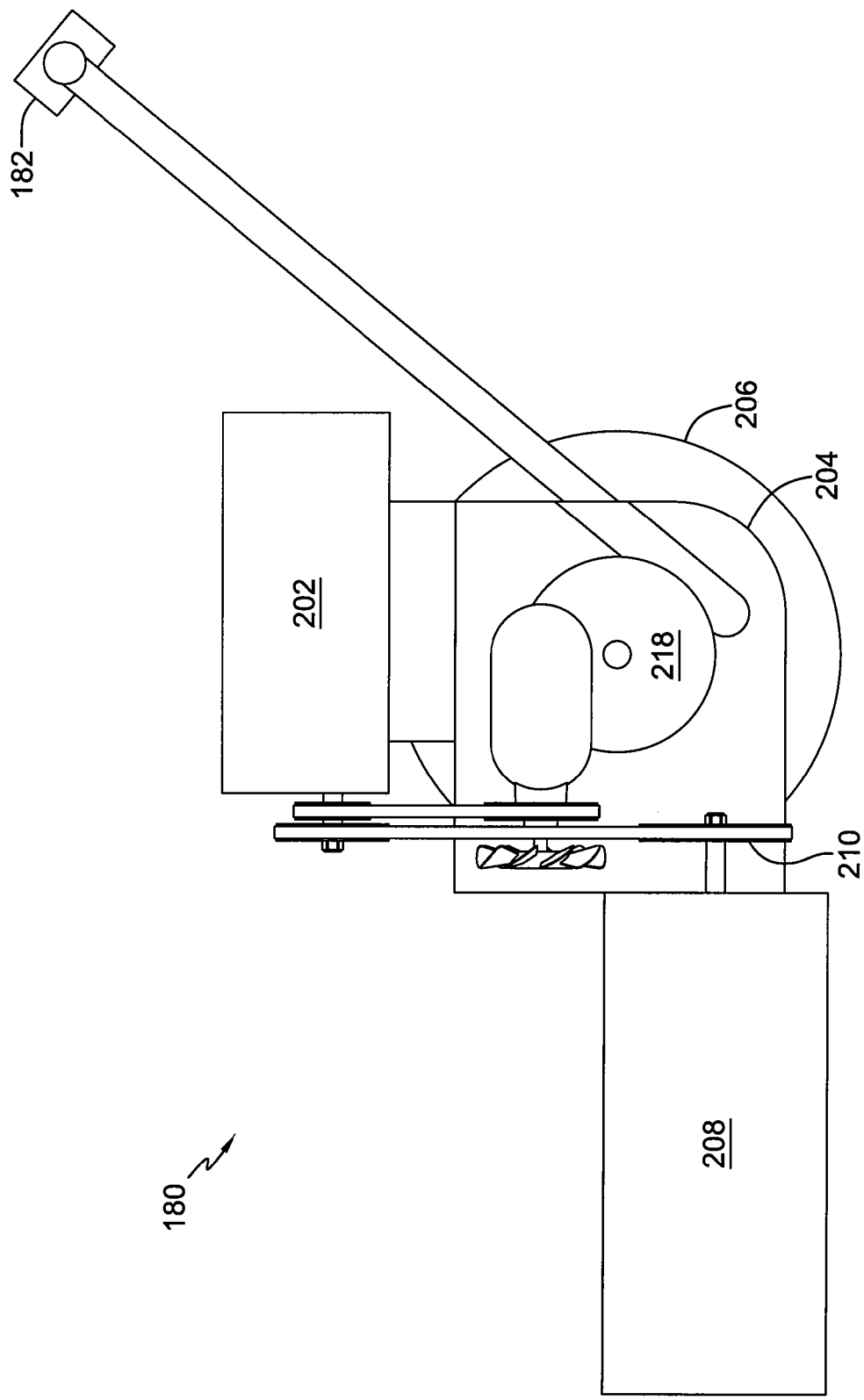
FIG. 27 depicts one type of vehicle on which the various embodiments disclosed herein may be used.

As previously noted, there are many vehicle configurations that may benefit from the embodiments disclosed herein. An exemplary vehicle 180 is depicted in FIG. 27. A prime mover 202 powers a variable drive 218, which may contain one of the planet brake differential assemblies previously described, which drives a plurality of tires 206. Note that one tire 206 was removed in FIG. 27 for clarity. These elements are all mounted to a vehicle frame 204, from which handles may extend for mounting of handle assembly 182. Vehicle 180 may also comprise a power take off 210 that selectively engages a driven mechanism 208 that may be a mower deck, brush cutter, snow thrower, sweeper, tiller or other powered mechanism.

While specific embodiments of the invention have been described in detail, it will be appreciated by those skilled in the art that various modifications and alternatives to those details could be developed in light of the overall teachings of the disclosure. Accordingly, the particular arrangements disclosed herein are meant to be illustrative only and not limiting as to the scope of the invention which is to be given the full breadth of the appended claims and any equivalents thereof.

What is claimed is:

1. A control system for controlling a vehicle, the vehicle having a prime mover, a transmission having a control shaft and a pair of wheels, each of the pair of wheels coupled to a respective drive assembly and a respective brake assembly, the transmission coupling the prime mover to each one of the drive assemblies, the control system comprising:

an electric actuator coupled to the control shaft of the transmission for controlling an output speed of the transmission and the forward and reverse motions of the vehicle, wherein the electric actuator is configured to rotate the control shaft of the transmission in a forward range of motion away from a neutral position and in a reverse range of motion away from the neutral position; and a brake switch having a brake position and a drive position, the brake switch for actuating each of the brake assemblies when in the brake position;

wherein the electric actuator is driven to rotate the control shaft of the transmission to the neutral position when the brake switch is in the brake position and the control shaft is not in the neutral position.

2. The control system of claim 1, further comprising a forward sensing switch and a reverse sensing switch that determine whether the control shaft of the transmission is in the forward range of motion away from the neutral position, in the reverse range of motion away from the neutral position, or in the neutral position.

3. The control system of claim 2, wherein when the brake switch is in the brake position and the forward sensing switch is in a closed state, the electric actuator is driven to rotate the control shaft of the transmission to the neutral position from the forward range of motion away from the neutral position.

4. The control system of claim 2, wherein when the brake switch is in the brake position and the reverse sensing switch is in a closed state, the electric actuator is driven to rotate the control shaft of the transmission to the neutral position from the reverse range of motion away from the neutral position.

5. The control system of claim 1, wherein the brake switch enables control of at least one operator switch when in the drive position, the at least one operator switch for providing a braking function and a driving function and for enabling control of a steering switch.

6. The control system of claim 1, further comprising a forward limit switch and a reverse limit switch, both coupled to the electric actuator, wherein the forward limit switch limits the forward range of motion of the electric actuator, and the reverse limit switch limits the reverse range of motion of the electric actuator.

7. The control system of claim 1, further comprising a control switch for controlling the electric actuator, the control switch in communication with at least one operator switch, the at least one operator switch for providing a braking function and a driving function and for enabling control of a steering switch.

8. The control system of claim 1, further comprising a dead man switch having an engaged position and a released position, the engaged position indicating a presence of an operator of the vehicle and the released position indicating an absence of the operator of the vehicle, wherein the dead man switch is biased to the released position, and wherein the electric actuator is driven to rotate the control shaft of the transmission to the neutral position when the dead man switch is in the released position and the control shaft is not in the neutral position.

9. A control system for controlling a vehicle, the vehicle having a prime mover, a transmission having a control shaft and a pair of wheels, each of the pair of wheels coupled to a respective drive assembly and a respective brake assembly, the transmission coupling the prime mover to each one of the drive assemblies, the control system comprising:
  an electric actuator coupled to the control shaft of the transmission for controlling an output speed of the transmission and the forward and reverse motions of the vehicle, wherein the electric actuator is configured to rotate the control shaft of the transmission in a forward range of motion away from a neutral position and in a reverse range of motion away from the neutral position; and
  a dead man switch having an engaged position and a released position, the engaged position indicating a presence of an operator of the vehicle and the released position indicating an absence of the operator of the vehicle, wherein the dead man switch is biased to the released position;
  wherein the electric actuator is driven to rotate the control shaft of the transmission to the neutral position when the dead man switch is in the released position and the control shaft is not in the neutral position.

10. The control system of claim 9, further comprising a forward sensing switch and a reverse sensing switch that determine whether the control shaft of the transmission is in the forward range of motion away from the neutral position, in the reverse range of motion away from the neutral position, or in the neutral position.

11. The control system of claim 10, wherein when the dead man switch is in the released position and the forward sensing switch is in a closed state, the electric actuator is driven to rotate the control shaft of the transmission to the neutral position from the forward range of motion away from the neutral position.

12. The control system of claim 10, wherein when the dead man switch is in the released position and the reverse sensing switch is in a closed state, the electric actuator is driven to rotate the control shaft of the transmission to the neutral position from the reverse range of motion away from the neutral position.

13. The control system of claim 9, further comprising a brake switch having a brake position and a drive position, the brake switch for actuating each of the brake assemblies when in the brake position, wherein the electric actuator is driven to rotate the control shaft of the transmission to the neutral position when the brake switch is in the brake position and the control shaft is not in the neutral position.

14. The control system of claim 13, wherein the brake switch enables control of at least one operator switch when in the drive position, the at least one operator switch for providing a braking function and a driving function and for enabling control of a steering switch.

15. The control system of claim 9, further comprising a forward limit switch and a reverse limit switch, both coupled to the electric actuator, wherein the forward limit switch limits the forward range of motion of the electric actuator, and the reverse limit switch limits the reverse range of motion of the electric actuator.

16. The control system of claim 9, further comprising a control switch for controlling the electric actuator, the control switch in communication with at least one operator switch, the at least one operator switch for providing a braking function and a driving function and for enabling control of a steering switch.

* * * * *